(12) United States Patent
Park et al.

(10) Patent No.: US 12,184,883 B2
(45) Date of Patent: Dec. 31, 2024

(54) IMAGE ENCODING/DECODING METHOD AND DEVICE HAVING MOTION INFORMATION DETERMINED ON BASIS OF INTERLAYER PREDICTION, AND METHOD FOR TRANSMITTING BITSTREAM

(71) Applicant: LG Electronics Inc., Seoul (KR)

(72) Inventors: Nae Ri Park, Seoul (KR); Jung Hak Nam, Seoul (KR); Hyeong Moon Jang, Seoul (KR); Jaehyun Lim, Seoul (KR); Seung Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 67 days.

(21) Appl. No.: 17/920,126

(22) PCT Filed: May 21, 2021

(86) PCT No.: PCT/KR2021/006338
§ 371 (c)(1),
(2) Date: Oct. 20, 2022

(87) PCT Pub. No.: WO2021/235888
PCT Pub. Date: Nov. 25, 2021

(65) Prior Publication Data
US 2023/0209081 A1 Jun. 29, 2023

Related U.S. Application Data

(60) Provisional application No. 63/028,541, filed on May 21, 2020.

(51) Int. Cl.
*H04N 19/513* (2014.01)
*H04N 19/176* (2014.01)

(52) U.S. Cl.
CPC ......... *H04N 19/513* (2014.11); *H04N 19/176* (2014.11)

(58) Field of Classification Search
None
See application file for complete search history.

(56) References Cited

U.S. PATENT DOCUMENTS

| 2013/0343459 A1* | 12/2013 | Bici | H04N 19/105 |
| 2014/0161186 A1* | 6/2014 | Zhang | H04N 19/103 |
| 2018/0084260 A1 | 3/2018 | Chien et al. | |

FOREIGN PATENT DOCUMENTS

| KR | 20160034933 | 3/2016 |
| KR | 20170098827 | 8/2017 |
| WO | WO2019218286 | 11/2019 |

OTHER PUBLICATIONS

Bross et al., "Versatile Video Coding (Draft 8)," JVET-Q2001-vE, Presented at Joint Video Experts Team (JVET) of ITU-T SG 16 WP 3 and ISO/IEC JTC 1/SC 29/WG 11, 17th Meeting: Brussels, BE, Jan. 7-17, 2020, 513 pages.

* cited by examiner

*Primary Examiner* — Christopher G Findley
(74) *Attorney, Agent, or Firm* — Fish & Richardson P.C.

(57) ABSTRACT

An image encoding/decoding method and apparatus are provided. An image decoding method performed by an image decoding apparatus may comprise determining a motion vector and decoding a current block based on the motion vector. The motion vector may be determined based on at least one of a first reference picture type of a first reference picture corresponding to the current block or a second reference picture type of a second reference picture corresponding to an inter-layer corresponding block.

12 Claims, 39 Drawing Sheets

FIG. 12
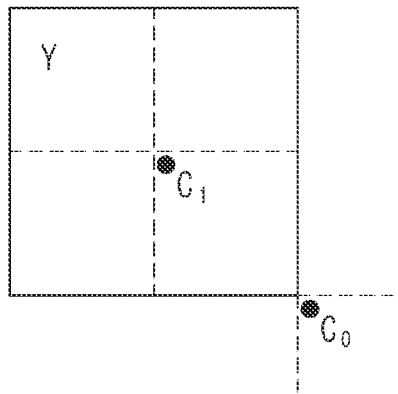
FIG. 13
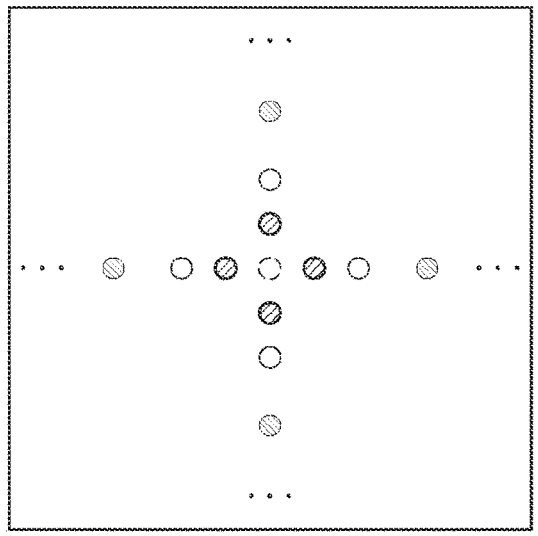 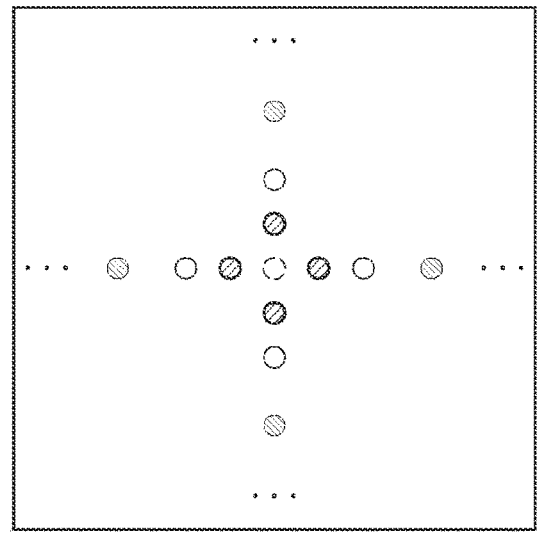

FIG. 14

| mmvd_distance_idx[x0][y0] | MmvdDistance[x0][y0] | |
|---|---|---|
| | slice_fpel_mmvd_enabled_flag == 0 | slice_fpel_mmvd_enabled_flag == 1 |
| 0 | 1 | 4 |
| 1 | 2 | 8 |
| 2 | 4 | 16 |
| 3 | 8 | 32 |
| 4 | 16 | 62 |
| 5 | 32 | 128 |
| 6 | 62 | 256 |
| 7 | 128 | 512 |

FIG. 15

| mmvd_direction_idx[x0][y0] | MmvdSign[x0][y0][0] | MmvdSign[x0][y0][1] |
|---|---|---|
| 0 | +1 | 0 |
| 1 | −1 | 0 |
| 2 | 0 | +1 |
| 3 | 0 | −1 |

FIG. 16

1610 —
The function LongTermRefPic( aPic, aPb, refIdx, LX ), with X being 0 or 1, is defined as follows
- If the picture with index refIdx from reference picture list LX of the slice containing prediction block aPb in the picture aPic was marked as "used for long-term reference" at the time when aPic was the current picture, LongTermRefPic( aPic, aPb, refIdx, LX ) is equal to 1.
- Otherwise, LongTermRefPic( aPic, aPb, refIdx, LX ) is equal to 0.

...

1620 —
- When availableFlagLXCol is equal to TRUE, mvLXCol and availableFlagLXCol are derived as follows:
  - If LongTermRefPic( currPic, currCb, refIdxLX, LX ) is not equal to LongTermRefPic( ColPic, colCb, refIdxCol, listCol ), both components of mvLXCol are set equal to 0 and availableFlagLXCol is set equal to 0.

- Otherwise, the variable availableFlagLXCol is set equal to 1, refPicList[ listCol ][ refIdxCol ] is set to be the picture with reference index refIdxCol in the reference picture list listCol of the slice containing coding block colCb in the collocated picture specified by ColPic, and the following applies:

colPocDiff = DiffPicOrderCnt( ColPic, refPicList[ listCol ][ refIdxCol ] )     (607)

currPocDiff = DiffPicOrderCnt( currPic, RefPicList[ X ][ refIdxLX ] )     (608)

- The temporal motion buffer compression process for collocated motion vectors as specified in clause 8.5.2.15 is invoked with mvCol as input, and the modified mvCol as output.

1630 —
- If RefPicList[ X ][ refIdxLX ] is an LTRP, or colPocDiff is equal to currPocDiff, mvLXCol is derived as follows:

mvLXCol = Clip3( −131072, 131071, mvCol )     (609)

1640 —
- Otherwise, mvLXCol is derived as a scaled version of the motion vector mvCol as follows:

tx = ( 16384 + ( Abs( td ) >> 1 ) ) / td     (610)

distScaleFactor = Clip3( −4096, 4095, ( tb * tx + 32 ) >> 6 )     (611)

mvLXCol = Clip3( −131072, 131071, ( distScaleFactor * mvCol +
             128 − ( distScaleFactor * mvCol >= 0 ) ) >> 8 )     (612)

where td and tb are derived as follows:

td = Clip3( −128, 127, colPocDiff )     (613)

tb = Clip3( −128, 127, currPocDiff )     (614)

FIG. 17
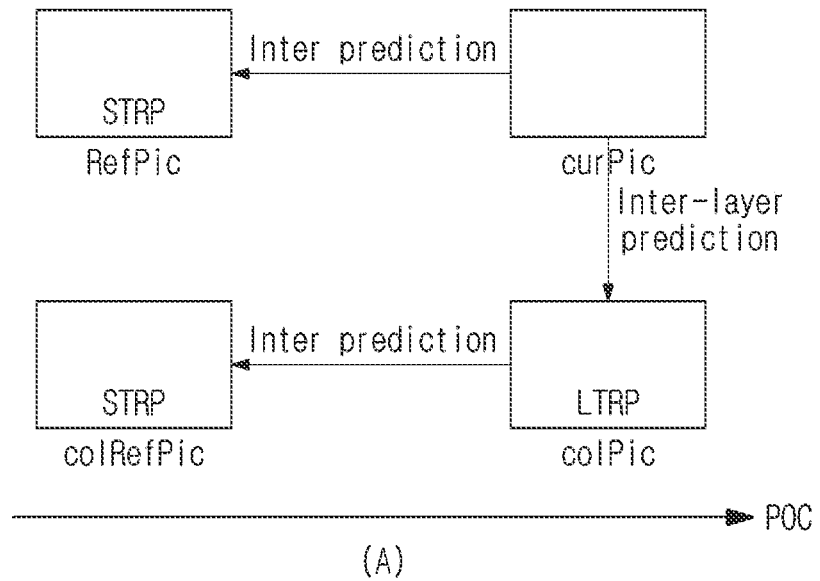
(A)
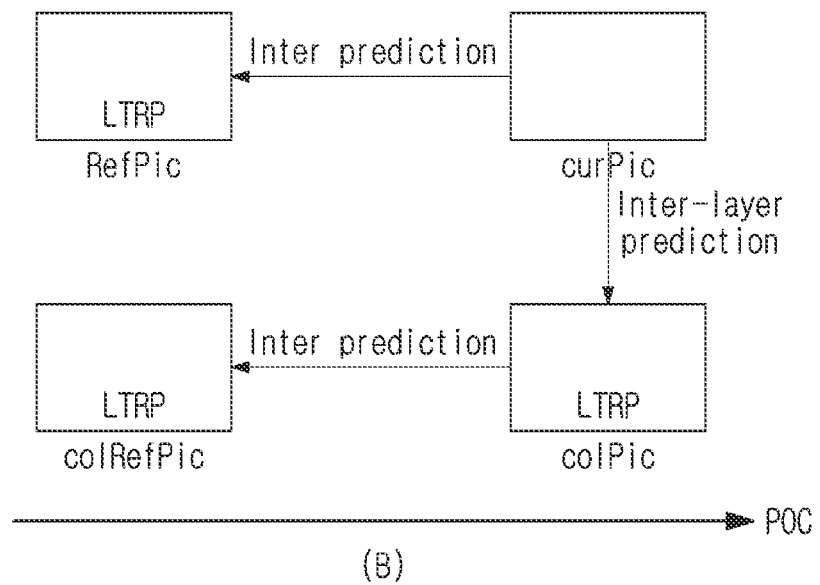
(B)

FIG. 19
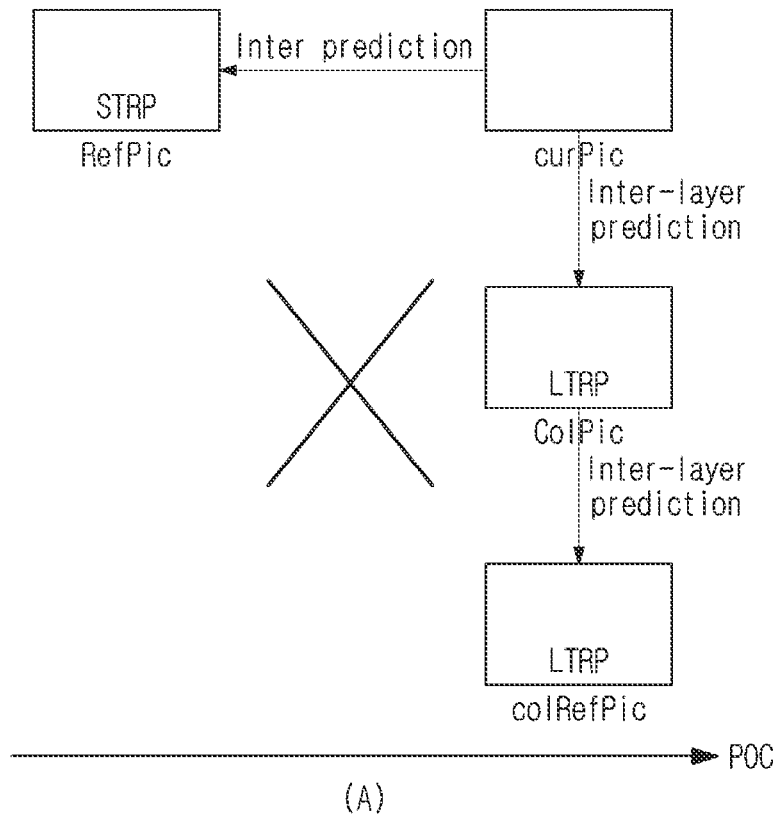
(A)
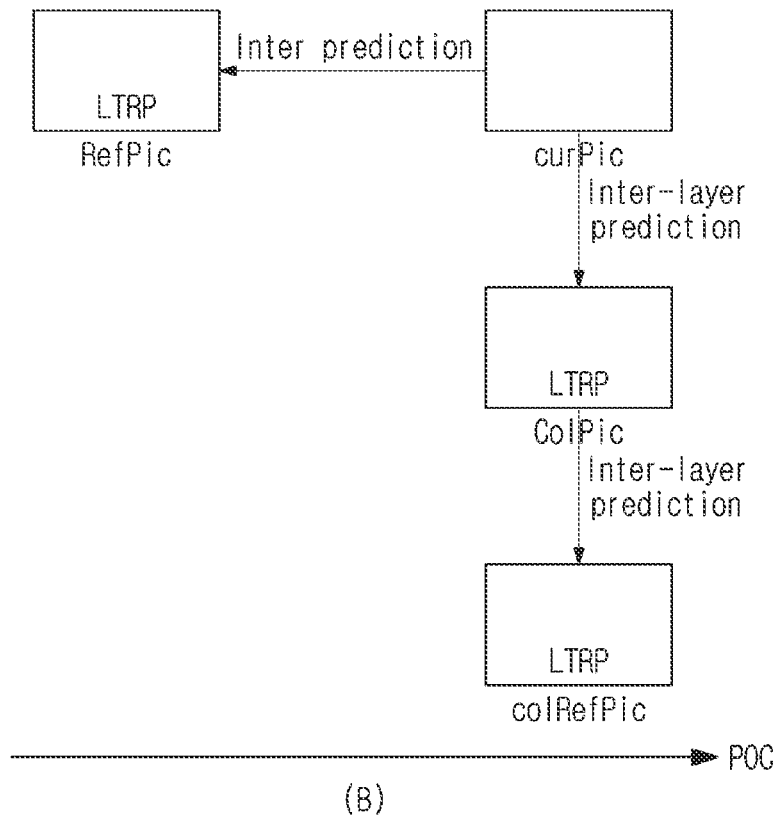
(B)

FIG. 21
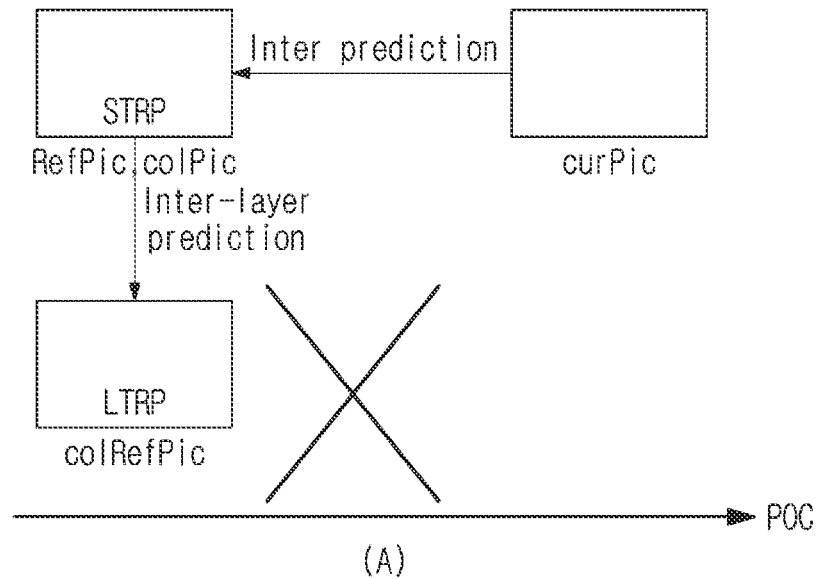
(A)
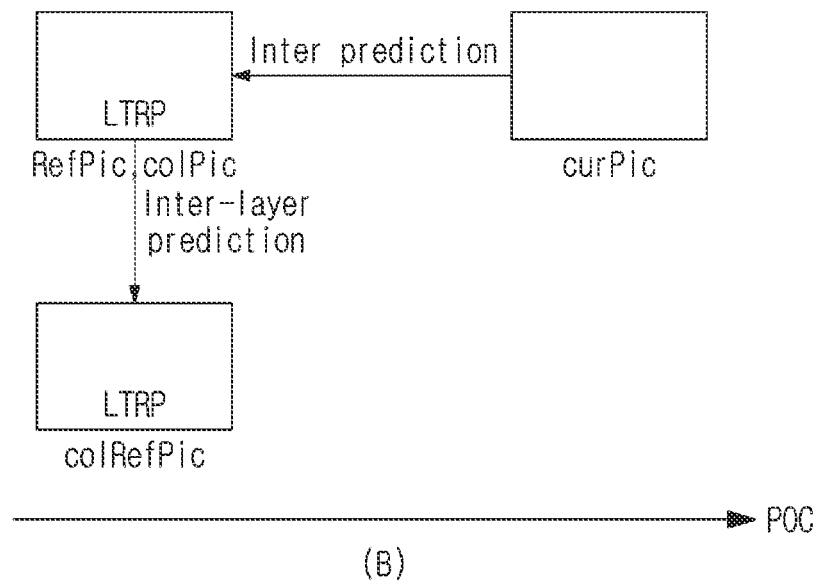
(B)

FIG. 22 sh_collocated_ref_idx specifies the reference index of the collocated picture used for temporal motion vector prediction.

When sh_slice_type is equal to P or when sh_slice_type is equal to B and sh_collocated_from_l0_flag is equal to 1, sh_collocated_ref_idx refers to an entry in reference picture list 0, and the value of sh_collocated_ref_idx shall be in the range of 0 to NumRefIdxActive[ 0 ] − 1, inclusive.

When sh_slice_type is equal to B and sh_collocated_from_l0_flag is equal to 0, sh_collocated_ref_idx refers to an entry in reference picture list 1, and the value of sh_collocated_ref_idx shall be in the range of 0 to NumRefIdxActive[ 1 ] − 1, inclusive.

When sh_collocated_ref_idx is not present, the following applies:
 − If pps_rpl_info_in_ph_flag is equal to 1, the value of sh_collocated_ref_idx is inferred to be equal to ph_collocated_ref_idx.
 − Otherwise (pps_rpl_info_in_ph_flag is equal to 0), the value of sh_collocated_ref_idx is inferred to be equal to 0.

It is a requirement of bitstream conformance that the picture referred to by sh_collocated_ref_idx shall be the same for all slices of a coded picture and RprConstraintsActive[ sh_collocated_from_l0_flag ? 0 : 1 ][ sh_collocated_ref_idx ] shall be equal to 0.

2210 — It is a requirement of bitstream conformance that the current picture and the collocated picture shall have nuh_layer_id equal to the nuh_layer_id of the reference picture of the current picture and the reference picture of the collocated picture, respectively.

NOTE – The above constraint requires the collocated picture to have the same spatial resolution and the same scaling window offsets as the current picture.

FIG. 23

The function LongTermRefPic( aPic, aPb, refIdx, LX ), with X being 0 or 1, is defined as follows:

2310 —
- If nuh_layer_id of the picture with index refIdx from reference picture list LX of the slice containing prediction block aPb in the picture aPic is not equal to nuh_layer_id of the picture aPic at the time when aPic was the current picture, LongTermRefPic(aPic, aPb, refIdx, LX) is equal to 2.
- Otherwise, if the picture with index refIdx from reference picture list LX of the slice containing prediction block aPb in the picture aPic was marked as "used for long-term reference" at the time when aPic was the current picture, LongTermRefPic( aPic, aPb, refIdx, LX ) is equal to 1.
- Otherwise, LongTermRefPic( aPic, aPb, refIdx, LX ) is equal to 0.

...

- When availableFlagLXCol is equal to TRUE, mvLXCol and availableFlagLXCol are derived as follows:

2320 —
- If LongTermRefPic( currPic, currCb, refIdxLX, LX ) is not equal to LongTermRefPic( ColPic, colCb, refIdxCol, listCol ) or LongTermRefPic( currPic, currCb, refIdxLX, LX ) and LongTermRefPic( ColPic, colCb, refIdxCol, listCol ) are both equal to 2, both components of mvLXCol are set equal to 0 and availableFlagLXCol is set equal to 0.

- Otherwise, the variable availableFlagLXCol is set equal to 1, refPicList[ listCol ][ refIdxCol ] is set to be the picture with reference index refIdxCol in the reference picture list listCol of the slice containing coding block colCb in the collocated picture specified by ColPic, and the following applies:

$$\text{colPocDiff} = \text{DiffPicOrderCnt}( \text{ColPic}, \text{refPicList}[ \text{listCol} ][ \text{refIdxCol} ] ) \quad (607)$$

$$\text{currPocDiff} = \text{DiffPicOrderCnt}( \text{currPic}, \text{RefPicList}[ X ][ \text{refIdxLX} ] ) \quad (608)$$

- The temporal motion buffer compression process for collocated motion vectors as specified in clause 8.5.2.15 is invoked with mvCol as input, and the modified mvCol as output.
- If RefPicList[ X ][ refIdxLX ] is an LTRP, or colPocDiff is equal to currPocDiff, mvLXCol is derived as follows:

$$\text{mvLXCol} = \text{Clip3}( -131072, 131071, \text{mvCol} ) \quad (609)$$

- Otherwise, mvLXCol is derived as a scaled version of the motion vector mvCol as follows:

$$tx = ( 16384 + ( \text{Abs}( td ) >> 1 ) ) / td \quad (610)$$

$$\text{distScaleFactor} = \text{Clip3}(-4096, 4095, ( tb * tx + 32 ) >> 6 ) \quad (611)$$

$$\text{mvLXCol} = \text{Clip3}( -131072, 131071, (\text{distScaleFactor} * \text{mvCol} + 128 - ( \text{distScaleFactor} * \text{mvCol} >= 0 ) ) >> 8 ) \quad (612)$$

where td and tb are derived as follows:

$$td = \text{Clip3}( -128, 127, \text{colPocDiff} ) \quad (613)$$

$$tb = \text{Clip3}( -128, 127, \text{currPocDiff} ) \quad (614)$$

FIG. 24 sh_collocated_ref_idx specifies the reference index of the collocated picture used for temporal motion vector prediction.

When sh_slice_type is equal to P or when sh_slice_type is equal to B and sh_collocated_from_l0_flag is equal to 1, sh_collocated_ref_idx refers to an entry in reference picture list 0, and the value of sh_collocated_ref_idx shall be in the range of 0 to NumRefIdxActive[ 0 ] − 1, inclusive.

When sh_slice_type is equal to B and sh_collocated_from_l0_flag is equal to 0, sh_collocated_ref_idx refers to an entry in reference picture list 1, and the value of sh_collocated_ref_idx shall be in the range of 0 to NumRefIdxActive[ 1 ] − 1, inclusive.

When sh_collocated_ref_idx is not present, the following applies:
- If pps_rpl_info_in_ph_flag is equal to 1, the value of sh_collocated_ref_idx is inferred to be equal to ph_collocated_ref_idx.
- Otherwise (pps_rpl_info_in_ph_flag is equal to 0), the value of sh_collocated_ref_idx is inferred to be equal to 0.

It is a requirement of bitstream conformance that the picture referred to by sh_collocated_ref_idx shall be the same for all slices of a coded picture and RprConstraintsActive[ sh_collocated_from_l0_flag ? 0 : 1 ][ sh_collocated_ref_idx ] shall be equal to 0.

2410 — It is a requirement of bitstream conformance that the reference picture of the current picture and the reference picture of the collocated picture shall be both ILRP or not.

NOTE – The above constraint requires the collocated picture to have the same spatial resolution and the same scaling window offsets as the current picture.

FIG. 25 sh_collocated_ref_idx specifies the reference index of the collocated picture used for temporal motion vector prediction.

When sh_slice_type is equal to P or when sh_slice_type is equal to B and sh_collocated_from_l0_flag is equal to 1, sh_collocated_ref_idx refers to an entry in reference picture list 0, and the value of sh_collocated_ref_idx shall be in the range of 0 to NumRefIdxActive[ 0 ] − 1, inclusive.

When sh_slice_type is equal to B and sh_collocated_from_l0_flag is equal to 0, sh_collocated_ref_idx refers to an entry in reference picture list 1, and the value of sh_collocated_ref_idx shall be in the range of 0 to NumRefIdxActive[ 1 ] − 1, inclusive.

When sh_collocated_ref_idx is not present, the following applies:
- If pps_rpl_info_in_ph_flag is equal to 1, the value of sh_collocated_ref_idx is inferred to be equal to ph_collocated_ref_idx.
- Otherwise (pps_rpl_info_in_ph_flag is equal to 0), the value of sh_collocated_ref_idx is inferred to be equal to 0.

It is a requirement of bitstream conformance that the picture referred to by sh_collocated_ref_idx shall be the same for all slices of a coded picture and RprConstraintsActive[ sh_collocated_from_l0_flag ? 0 : 1 ][ sh_collocated_ref_idx ] shall be equal to 0.

2510 — It is a requirement of bitstream conformance that the current picture and the collocated picture shall have nuh_layer_id equal to the nuh_layer_id of the reference picture of the current picture and the reference picture of the collocated picture, respectively or the current picture and the collocated picture shall have nuh_layer_id not equal to the nuh_layer_id of the reference picture of the current picture and the reference picture of the collocated picture, respectively.

NOTE – The above constraint requires the collocated picture to have the same spatial resolution and the same scaling window offsets as the current picture.

FIG. 26

The function LongTermRefPic( aPic, aPb, refIdx, LX ), with X being 0 or 1, is defined as follows:

2610 — – If nuh_layer_id of the picture with index refIdx from reference picture list LX of the slice containing prediction block aPb in the picture aPic is not equal to nuh_layer_id of the picture aPic at the time when aPic was the current picture, LongTermRefPic(aPic, aPb, refIdx, LX) is equal to 2.

– Otherwise, if the picture with index refIdx from reference picture list LX of the slice containing prediction block aPb in the picture aPic was marked as "used for long-term reference" at the time when aPic was the current picture, LongTermRefPic( aPic, aPb, refIdx, LX ) is equal to 1.

– Otherwise, LongTermRefPic( aPic, aPb, refIdx, LX ) is equal to 0.

...

– When availableFlagLXCol is equal to TRUE, mvLXCol and availableFlagLXCol are derived as follows:

– If LongTermRefPic( currPic, currCb, refIdxLX, LX ) is not equal to LongTermRefPic( ColPic, colCb, refIdxCol, listCol ), both components of mvLXCol are set equal to 0 and availableFlagLXCol is set equal to 0.

– Otherwise, the variable availableFlagLXCol is set equal to 1, refPicList[ listCol ][ refIdxCol ] is set to be the picture with reference index refIdxCol in the reference picture list listCol of the slice containing coding block colCb in the collocated picture specified by ColPic, and the following applies:

$$\text{colPocDiff} = \text{DiffPicOrderCnt}( \text{ColPic}, \text{refPicList}[ \text{listCol} ][ \text{refIdxCol} ] ) \quad (607)$$

$$\text{currPocDiff} = \text{DiffPicOrderCnt}( \text{currPic}, \text{RefPicList}[ X ][ \text{refIdxLX} ] ) \quad (608)$$

– The temporal motion buffer compression process for collocated motion vectors as specified in clause 8.5.2.15 is invoked with mvCol as input, and the modified mvCol as output.

– If RefPicList[ X ][ refIdxLX ] is an LTRP, or colPocDiff is equal to currPocDiff, mvLXCol is derived as follows:

$$\text{mvLXCol} = \text{Clip3}( -131072, 131071, \text{mvCol} ) \quad (609)$$

– Otherwise, mvLXCol is derived as a scaled version of the motion vector mvCol as follows:

$$tx = ( 16384 + ( \text{Abs}( td ) >> 1 ) ) / td \quad (610)$$

$$\text{distScaleFactor} = \text{Clip3}( -4096, 4095, ( tb * tx + 32 ) >> 6 ) \quad (611)$$

$$\text{mvLXCol} = \text{Clip3}( -131072, 131071, (\text{distScaleFactor} * \text{mvCol} + 128 - ( \text{distScaleFactor} * \text{mvCol} >= 0 ) ) >> 8 ) \quad (612)$$

where td and tb are derived as follows:

$$td = \text{Clip3}( -128, 127, \text{colPocDiff} ) \quad (613)$$

$$tb = \text{Clip3}( -128, 127, \text{currPocDiff} ) \quad (614)$$

FIG. 28
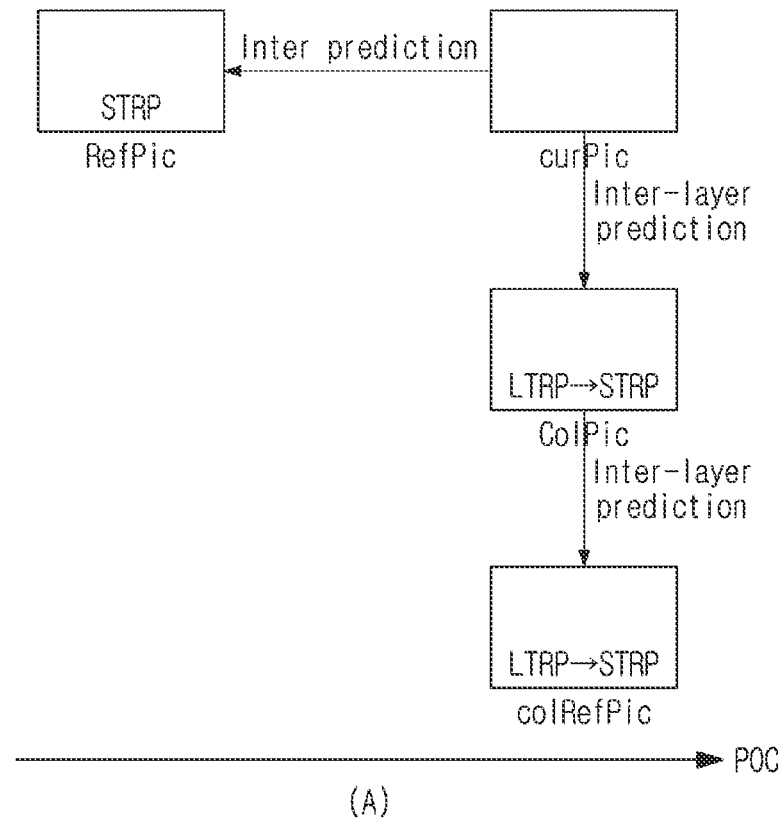
(A)
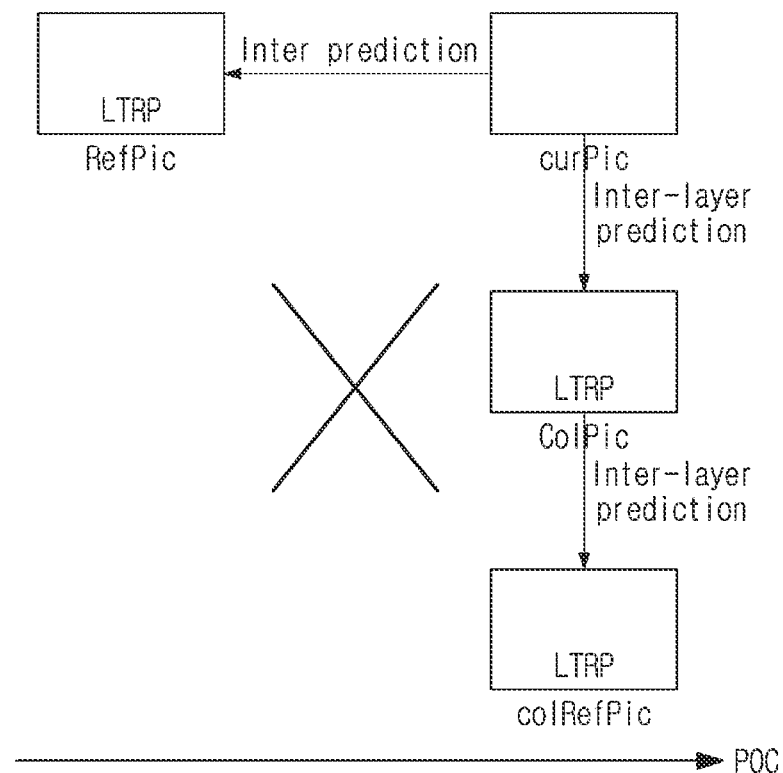
(B)

FIG. 30

The function LongTermRefPic( aPic, aPb, refIdx, LX ), with X being 0 or 1, is defined as follows:

3010 — If the picture with index refIdx from reference picture list LX of the slice containing prediction block aPb in the picture aPic was marked as "used for long-term reference" and nuh_layer_id of the picture aPic is equal to nuh_layer_id of the reference picture at the time when aPic was the current picture, LongTermRefPic( aPic, aPb, refIdx, LX ) is equal to 1.

— Otherwise, LongTermRefPic( aPic, aPb, refIdx, LX ) is equal to 0.

...

— When availableFlagLXCol is equal to TRUE, mvLXCol and availableFlagLXCol are derived as follows:

3020 — If LongTermRefPic( currPic, currCb, refIdxLX, LX ) is not equal to LongTermRefPic( ColPic, colCb, refIdxCol, listCol ), both components of mvLXCol are set equal to 0 and availableFlagLXCol is set equal to 0.

— Otherwise, the variable availableFlagLXCol is set equal to 1, refPicList[ listCol ][ refIdxCol ] is set to be the picture with reference index refIdxCol in the reference picture list listCol of the slice containing coding block colCb in the collocated picture specified by ColPic, and the following applies:

$$colPocDiff = DiffPicOrderCnt( ColPic, refPicList[ listCol ][ refIdxCol ] ) \quad (607)$$

$$currPocDiff = DiffPicOrderCnt( currPic, RefPicList[ X ][ refIdxLX ] ) \quad (608)$$

— The temporal motion buffer compression process for collocated motion vectors as specified in clause 8.5.2.15 is invoked with mvCol as input, and the modified mvCol as output.

3030 — If RefPicList[ X ][ refIdxLX ] is an LTRP, colPocDiff is equal to 0, or colPocDiff is equal to currPocDiff, mvLXCol is derived as follows:

$$mvLXCol = Clip3( -131072, 131071, mvCol ) \quad (609)$$

3040 — Otherwise, mvLXCol is derived as a scaled version of the motion vector mvCol as follows:

$$tx = ( 16384 + ( Abs( td ) >> 1 ) ) / td \quad (610)$$

$$distScaleFactor = Clip3( -4096, 4095, ( tb * tx + 32 ) >> 6 ) \quad (611)$$

$$mvLXCol = Clip3( -131072, 131071, (distScaleFactor * mvCol + 128 - ( distScaleFactor * mvCol >= 0 )) >> 8 ) \quad (612)$$

where td and tb are derived as follows:

$$td = Clip3( -128, 127, colPocDiff ) \quad (613)$$

$$tb = Clip3( -128, 127, currPocDiff ) \quad (614)$$

FIG. 31

The function LongTermRefPic( aPic, aPb, refIdx, LX ), with X being 0 or 1, is defined as follows:

3110
- If nuh_layer_id of the picture with index refIdx from reference picture list LX of the slice containing prediction block aPb in the picture aPic is not equal to nuh_layer_id of the picture aPic at the time when aPic was the current picture, LongTermRefPic(aPic, aPb, refIdx, LX) is equal to 2.
- Otherwise, if the picture with index refIdx from reference picture list LX of the slice containing prediction block aPb in the picture aPic was marked as "used for long-term reference" at the time when aPic was the current picture, LongTermRefPic( aPic, aPb, refIdx, LX ) is equal to 1.
- Otherwise, LongTermRefPic( aPic, aPb, refIdx, LX ) is equal to 0.

...

- When availableFlagLXCol is equal to TRUE, mvLXCol and availableFlagLXCol are derived as follows:

3120
- If LongTermRefPic( currPic, currCb, refIdxLX, LX ) is not equal to LongTermRefPic( ColPic, colCb, refIdxCol, listCol ) and LongTermRefPic( currPic, currCb, refIdxLX, LX ) or LongTermRefPic( ColPic, colCb, refIdxCol, listCol ) is not equal to 2, both components of mvLXCol are set equal to 0 and availableFlagLXCol is set equal to 0.
- Otherwise, the variable availableFlagLXCol is set equal to 1, refPicList[ listCol ][ refIdxCol ] is set to be the picture with reference index refIdxCol in the reference picture list listCol of the slice containing coding block colCb in the collocated picture specified by ColPic, and the following applies:

colPocDiff = DiffPicOrderCnt( ColPic, refPicList[ listCol ][ refIdxCol ] )  (607)

currPocDiff = DiffPicOrderCnt( currPic, RefPicList[ X ][ refIdxLX ] )  (608)

- The temporal motion buffer compression process for collocated motion vectors as specified in clause 8.5.2.15 is invoked with mvCol as input, and the modified mvCol as output.
- If RefPicList[ X ][ refIdxLX ] is an LTRP, or colPocDiff is equal to currPocDiff, mvLXCol is derived as follows:

mvLXCol = Clip3( −131072, 131071, mvCol )  (609)

- Otherwise, mvLXCol is derived as a scaled version of the motion vector mvCol as follows:

tx = ( 16384 + ( Abs( td ) >> 1 ) ) / td  (610)

distScaleFactor = Clip3( −4096, 4095, ( tb * tx + 32 ) >> 6 )  (611)

mvLXCol = Clip3( −131072, 131071, (distScaleFactor * mvCol +
           128 − ( distScaleFactor * mvCol >= 0 ) ) >> 8 )  (612)

where td and tb are derived as follows:

td = Clip3( −128, 127, colPocDiff )  (613)

tb = Clip3( −128, 127, currPocDiff )  (614)

FIG. 32

The function LongTermRefPic( aPic, aPb, refIdx, LX ), with X being 0 or 1, is defined as follows:

- If the picture with index refIdx from reference picture list LX of the slice containing prediction block aPb in the picture aPic was marked as "used for long-term reference" at the time when aPic was the current picture, LongTermRefPic( aPic, aPb, refIdx, LX ) is equal to 1.
- Otherwise, LongTermRefPic( aPic, aPb, refIdx, LX ) is equal to 0.

...

- When availableFlagLXCol is equal to TRUE, mvLXCol and availableFlagLXCol are derived as follows:

3210 —
  - If LongTermRefPic( currPic, currCb, refIdxLX, LX ) is not equal to LongTermRefPic( ColPic, colCb, refIdxCol, listCol ) and nuh_layer_id of the picture currPic and ColPic is equal to nuh_layer_id of the reference picture of its, both components of mvLXCol are set equal to 0 and availableFlagLXCol is set equal to 0.

- Otherwise, the variable availableFlagLXCol is set equal to 1, refPicList[ listCol ][ refIdxCol ] is set to be the picture with reference index refIdxCol in the reference picture list listCol of the slice containing coding block colCb in the collocated picture specified by ColPic, and the following applies:

colPocDiff = DiffPicOrderCnt( ColPic, refPicList[ listCol ][ refIdxCol ] )    (607)

currPocDiff = DiffPicOrderCnt( currPic, RefPicList[ X ][ refIdxLX ] )    (608)

- The temporal motion buffer compression process for collocated motion vectors as specified in clause 8.5.2.15 is invoked with mvCol as input, and the modified mvCol as output.

3220 —
  - If RefPicList[ X ][ refIdxLX ] is an LTRP, colPocDiff is equal to 0, or colPocDiff is equal to currPocDiff, mvLXCol is derived as follows:

mvLXCol = Clip3( −131072, 131071, mvCol )    (609)

- Otherwise, mvLXCol is derived as a scaled version of the motion vector mvCol as follows:

$tx = ( 16384 + ( Abs( td ) >> 1 ) ) / td$    (610)

$distScaleFactor = Clip3( -4096, 4095, ( tb * tx + 32 ) >> 6 )$    (611)

$mvLXCol = Clip3( -131072, 131071, (distScaleFactor * mvCol + 128 - ( distScaleFactor * mvCol >= 0 ) ) >> 8 )$    (612)

where td and tb are derived as follows:

$td = Clip3( -128, 127, colPocDiff )$    (613)

$tb = Clip3( -128, 127, currPocDiff )$    (614)

FIG. 33

The variable currPic specifies the current picture.
The luma merge motion vector differences mMvdL0 and mMvdL1 are derived as follows:

- If both predFlagL0 and predFlagL1 are equal to 1, the following applies:

$$\text{currPocDiffL0} = \text{DiffPicOrderCnt}(\text{currPic}, \text{RefPicList}[0][\text{refIdxL0}])  \quad (562)$$

$$\text{currPocDiffL1} = \text{DiffPicOrderCnt}(\text{currPic}, \text{RefPicList}[1][\text{refIdxL1}])  \quad (563)$$

3310 —
- If currPocDiffL0 is equal to currPocDiffL1, the following applies:

$$\text{mMvdL0}[0] = \text{MmvdOffset}[xCb][yCb][0]  \quad (564)$$

$$\text{mMvdL0}[1] = \text{MmvdOffset}[xCb][yCb][1]  \quad (565)$$

$$\text{mMvdL1}[0] = \text{MmvdOffset}[xCb][yCb][0]  \quad (566)$$

$$\text{mMvdL1}[1] = \text{MmvdOffset}[xCb][yCb][1]  \quad (567)$$

3320 —
- Otherwise, if Abs(currPocDiffL0) is greater than or equal to Abs(currPocDiffL1), the following applies:

$$\text{mMvdL0}[0] = \text{MmvdOffset}[xCb][yCb][0]  \quad (568)$$

$$\text{mMvdL0}[1] = \text{MmvdOffset}[xCb][yCb][1]  \quad (569)$$

3330 —
- If RefPicList[0][refIdxL0] is not an LTRP and RefPicList[1][refIdxL1] is not an LTRP, the following applies:

$$td = \text{Clip3}(-128, 127, \text{currPocDiffL0})  \quad (570)$$

$$tb = \text{Clip3}(-128, 127, \text{currPocDiffL1})  \quad (571)$$

$$tx = (16384 + (\text{Abs}(td) >> 1))/td  \quad (572)$$

$$\text{distScaleFactor} = \text{Clip3}(-4096, 4095, (tb * tx + 32) >> 6)  \quad (573)$$

$$\text{mMvdL1}[0] = \text{Clip3}(-2^{17}, 2^{17} - 1, (\text{distScaleFactor} * \text{mMvdL0}[0] + 128 - (\text{distScaleFactor} * \text{mMvdL0}[0] >= 0)) >> 8)  \quad (574)$$

$$\text{mMvdL1}[1] = \text{Clip3}(-2^{17}, 2^{17} - 1, (\text{distScaleFactor} * \text{mMvdL0}[1] + 128 - (\text{distScaleFactor} * \text{mMvdL0}[1] >= 0)) >> 8)  \quad (575)$$

3340 —
- Otherwise, the following applies:

$$\text{mMvdL1}[0] = \text{Sign}(\text{currPocDiffL0}) == \text{Sign}(\text{currPocDiffL1})\ ?\ \text{mMvdL0}[0] : -\text{mMvdL0}[0]  \quad (576)$$

$$\text{mMvdL1}[1] = \text{Sign}(\text{currPocDiffL0}) == \text{Sign}(\text{currPocDiffL1})\ ?\ \text{mMvdL0}[1] : -\text{mMvdL0}[1]  \quad (577)$$

FIG. 34

3350 — Otherwise (Abs( currPocDiffL0 ) is less than Abs( currPocDiffL1 )), the following applies:

$$mMvdL1[\ 0\ ] = MmvdOffset[\ xCb\ ][\ yCb\ ][\ 0\ ] \quad (578)$$

$$mMvdL1[\ 1\ ] = MmvdOffset[\ xCb\ ][\ yCb\ ][\ 1\ ] \quad (579)$$

3360 — If RefPicList[ 0 ][ refIdxL0 ] is not an LTRP and RefPicList[ 1 ][ refIdxL1 ] is not an LTRP, the following applies:

$$td = Clip3(\ -128,\ 127,\ currPocDiffL1\ ) \quad (580)$$

$$tb = Clip3(\ -128,\ 127,\ currPocDiffL0\ ) \quad (581)$$

$$tx = (\ 16384 + (\ Abs(\ td\ ) >> 1\ )\ )\ /\ td \quad (582)$$

$$distScaleFactor = Clip3(\ -4096,\ 4095,\ (\ tb\ *\ tx + 32\ ) >> 6\ ) \quad (583)$$

$$mMvdL0[\ 0\ ] = Clip3(\ -2^{17},\ 2^{17} - 1,\ (distScaleFactor\ *\ mMvdL1[\ 0\ ] + 128 - (distScaleFactor\ *\ mMvdL1[\ 0\ ] >= 0)\ ) >> 8\ ) \quad (584)$$

$$mMvdL0[\ 1\ ] = Clip3(\ -2^{17},\ 2^{17} - 1,\ ,(distScaleFactor\ *\ mMvdL1[\ 1\ ] + 128 - (distScaleFactor\ *\ mMvdL1[\ 1\ ] >= 0)\ ) >> 8\ )\ ) \quad (585)$$

3370 — Otherwise, the following applies:

$$mMvdL0[\ 0\ ] = Sign(\ currPocDiffL0\ ) == Sign(\ currPocDiffL1\ )\ ?\ mMvdL1[\ 0\ ] : -mMvdL1[\ 0\ ] \quad (586)$$

$$mMvdL0[\ 1\ ] = Sign(\ currPocDiffL0\ ) == Sign(\ currPocDiffL1\ )\ ?\ mMvdL1[\ 1\ ] : -mMvdL1[\ 1\ ] \quad (587)$$

— Otherwise ( predFlagL0 or predFlagL1 are equal to 1 ), the following applies for X being 0 and 1:

$$mMvdLX[\ 0\ ] = (\ predFlagLX == 1\ )\ ?\ MmvdOffset[\ xCb\ ][\ yCb\ ][\ 0\ ] : 0 \quad (588)$$

$$mMvdLX[\ 1\ ] = (\ predFlagLX == 1\ )\ ?\ MmvdOffset[\ xCb\ ][\ yCb\ ][\ 1\ ] : 0 \quad (589)$$

FIG. 35

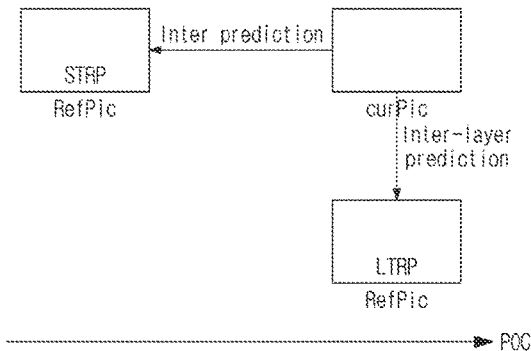

FIG. 36

The variable currPic specifies the current picture.
The luma merge motion vector differences mMvdL0 and mMvdL1 are derived as follows:

- If both predFlagL0 and predFlagL1 are equal to 1, the following applies:

$$\text{currPocDiffL0} = \text{DiffPicOrderCnt}(\text{currPic}, \text{RefPicList}[0][\text{refIdxL0}]) \quad (562)$$

$$\text{currPocDiffL1} = \text{DiffPicOrderCnt}(\text{currPic}, \text{RefPicList}[1][\text{refIdxL1}]) \quad (563)$$

- If currPocDiffL0 is equal to currPocDiffL1, the following applies:

$$\text{mMvdL0}[0] = \text{MmvdOffset}[xCb][yCb][0] \quad (564)$$

$$\text{mMvdL0}[1] = \text{MmvdOffset}[xCb][yCb][1] \quad (565)$$

$$\text{mMvdL1}[0] = \text{MmvdOffset}[xCb][yCb][0] \quad (566)$$

$$\text{mMvdL1}[1] = \text{MmvdOffset}[xCb][yCb][1] \quad (567)$$

- Otherwise, if Abs( currPocDiffL0 ) is greater than or equal to Abs( currPocDiffL1 ), the following applies:

$$\text{mMvdL0}[0] = \text{MmvdOffset}[xCb][yCb][0] \quad (568)$$

$$\text{mMvdL0}[1] = \text{MmvdOffset}[xCb][yCb][1] \quad (569)$$

- If RefPicList[ 0 ][ refIdxL0 ] is not an LTRP and RefPicList[ 1 ][ refIdxL1 ] is not an LTRP, the following applies:

$$td = \text{Clip3}(-128, 127, \text{currPocDiffL0}) \quad (570)$$

$$tb = \text{Clip3}(-128, 127, \text{currPocDiffL1}) \quad (571)$$

$$tx = (16384 + (\text{Abs}(td) >> 1)) / td \quad (572)$$

$$\text{distScaleFactor} = \text{Clip3}(-4096, 4095, (tb * tx + 32) >> 6) \quad (573)$$

$$\text{mMvdL1}[0] = \text{Clip3}(-2^{17}, 2^{17} - 1, (\text{distScaleFactor} * \text{mMvdL0}[0] + \quad (574)$$
$$128 - (\text{distScaleFactor} * \text{mMvdL0}[0] >= 0)) >> 8)$$

$$\text{mMvdL1}[1] = \text{Clip3}(-2^{17}, 2^{17} - 1, (\text{distScaleFactor} * \text{mMvdL0}[1] + \quad (575)$$
$$128 - (\text{distScaleFactor} * \text{mMvdL0}[1] >= 0)) >> 8)$$

- Otherwise, the following applies:

3610

$$\text{mMvdL1}[0] = \text{Sign}(\text{currPocDiffL0}) == \text{Sign}(\text{currPocDiffL1}) \| \text{Sign}(\text{currPocDiffL1}) == 0 \; ?$$
$$\text{mMvdL0}[0] : -\text{mMvdL0}[0] \quad (576)$$

$$\text{mMvdL1}[1] = \text{Sign}(\text{currPocDiffL0}) == \text{Sign}(\text{currPocDiffL1}) \| \text{Sign}(\text{currPocDiffL1}) == 0 \; ?$$
$$\text{mMvdL0}[1] : -\text{mMvdL0}[1] \quad (577)$$

FIG. 37

- Otherwise ( Abs( currPocDiffL0 ) is less than Abs( currPocDiffL1 ) ), the following applies:

mMvdL1[ 0 ] = MmvdOffset[ xCb ][ yCb ][ 0 ]   (578)

mMvdL1[ 1 ] = MmvdOffset[ xCb ][ yCb ][ 1 ]   (579)

- If RefPicList[ 0 ][ refIdxL0 ] is not an LTRP and RefPicList[ 1 ][ refIdxL1 ] is not an LTRP, the following applies:

td = Clip3( −128, 127, currPocDiffL1 )   (580)

tb = Clip3( −128, 127, currPocDiffL0 )   (581)

tx = ( 16384 + ( Abs( td ) >> 1 ) ) / td   (582)

distScaleFactor = Clip3( −4096, 4095, ( tb * tx + 32 ) >> 6 )   (583)

mMvdL0[ 0 ] = Clip3( −2$^{17}$, 2$^{17}$ − 1, (distScaleFactor * mMvdL1[ 0 ] +   (584)
                     128 − (distScaleFactor * mMvdL1[ 0 ] >= 0) ) >> 8 )

mMvdL0[ 1 ] = Clip3( −2$^{17}$, 2$^{17}$ − 1, , (distScaleFactor * mMvdL1[ 1 ] +   (585)
                     128 − (distScaleFactor * mMvdL1[ 1 ] >= 0) ) >>
                     8 ) )

- Otherwise, the following applies:

3620 —
        mMvdL0[ 0 ] = Sign( currPocDiffL0 ) == Sign( currPocDiffL1 ) || Sign( currPocDiffL0 ) == 0 ?
                      mMvdL1[ 0 ] : −mMvdL1[ 0 ]   (586)

mMvdL0[ 1 ] = Sign( currPocDiffL0 ) == Sign( currPocDiffL1 ) || Sign( currPocDiffL0 ) == 0 ?
                      mMvdL1[ 1 ] : −mMvdL1[ 1 ]   (587)

- Otherwise ( predFlagL0 or predFlagL1 are equal to 1 ), the following applies for X being 0 and 1:

mMvdLX[ 0 ] = ( predFlagLX == 1 ) ? MmvdOffset[ xCb ][ yCb ][ 0 ] : 0   (588)

mMvdLX[ 1 ] = ( predFlagLX == 1 ) ? MmvdOffset[ xCb ][ yCb ][ 1 ] : 0   (589)

FIG. 38

The variable currPic specifies the current picture.
The luma merge motion vector differences mMvdL0 and mMvdL1 are derived as follows:

- If both predFlagL0 and predFlagL1 are equal to 1, the following applies:

currPocDiffL0 = DiffPicOrderCnt( currPic, RefPicList[ 0 ][ refIdxL0 ] )  (562)

currPocDiffL1 = DiffPicOrderCnt( currPic, RefPicList[ 1 ][ refIdxL1 ] )  (563)

- If currPocDiffL0 is equal to currPocDiffL1 or Sign( currPocDiffL0 ) is equal to 0 or Sign( currPocDiffL1 ) is equal to 0, the following applies:

mMvdL0[ 0 ] = MmvdOffset[ xCb ][ yCb ][ 0 ]  (564)

mMvdL0[ 1 ] = MmvdOffset[ xCb ][ yCb ][ 1 ]  (565)

mMvdL1[ 0 ] = MmvdOffset[ xCb ][ yCb ][ 0 ]  (566)

mMvdL1[ 1 ] = MmvdOffset[ xCb ][ yCb ][ 1 ]  (567)

[3810]

- Otherwise, if Abs( currPocDiffL0 ) is greater than or equal to Abs( currPocDiffL1 ), the following applies:

mMvdL0[ 0 ] = MmvdOffset[ xCb ][ yCb ][ 0 ]  (568)

mMvdL0[ 1 ] = MmvdOffset[ xCb ][ yCb ][ 1 ]  (569)

If RefPicList[ 0 ][ refIdxL0 ] is not an LTRP and RefPicList[ 1 ][ refIdxL1 ] is not an LTRP, the following applies.

td = Clip3( −128, 127, currPocDiffL0 )  (570)

tb = Clip3( −128, 127, currPocDiffL1 )  (571)

tx = ( 16384 + ( Abs( td ) >> 1 ) ) / td  (572)

distScaleFactor = Clip3( −4096, 4095, ( tb * tx + 32 ) >> 6 )  (573)

mMvdL1[ 0 ] = Clip3( $-2^{17}$, $2^{17}-1$, (distScaleFactor * mMvdL0[ 0 ] + 128 − ( distScaleFactor * mMvdL0[ 0 ] >= 0 ) ) >> 8 )  (574)

mMvdL1[ 1 ] = Clip3( $-2^{17}$, $2^{17}-1$, (distScaleFactor * mMvdL0[ 1 ] + 128 − ( distScaleFactor * mMvdL0[ 1 ] >= 0 ) ) >> 8 )  (575)

- Otherwise, the following applies:

mMvdL1[ 0 ] = Sign( currPocDiffL0 ) == Sign( currPocDiffL1 ) ? mMvdL0[ 0 ] : −mMvdL0[ 0 ]  (576)

mMvdL1[ 1 ] = Sign( currPocDiffL0 ) == Sign( currPocDiffL1 ) ? mMvdL0[ 1 ] : −mMvdL0[ 1 ]  (577)

FIG. 39

The variable currPic specifies the current picture.
The luma merge motion vector differences mMvdL0 and mMvdL1 are derived as follows:

- If both predFlagL0 and predFlagL1 are equal to 1, the following applies:

currPocDiffL0 = DiffPicOrderCnt( currPic, RefPicList[ 0 ][ refIdxL0 ] )   (562)

currPocDiffL1 = DiffPicOrderCnt( currPic, RefPicList[ 1 ][ refIdxL1 ] )   (563)

- If currPocDiffL0 is equal to currPocDiffL1, the following applies:

mMvdL0[ 0 ] = MmvdOffset[ xCb ][ yCb ][ 0 ]   (564)

mMvdL0[ 1 ] = MmvdOffset[ xCb ][ yCb ][ 1 ]   (565)

mMvdL1[ 0 ] = MmvdOffset[ xCb ][ yCb ][ 0 ]   (566)

mMvdL1[ 1 ] = MmvdOffset[ xCb ][ yCb ][ 1 ]   (567)

3910—
    - Otherwise, if Abs( currPocDiffL0 ) is greater than or equal to Abs( currPocDiffL1 ) or Sign( currPocDiffL0 ) is equal to 0, the following applies:

mMvdL0[ 0 ] = MmvdOffset[ xCb ][ yCb ][ 0 ]   (568)

mMvdL0[ 1 ] = MmvdOffset[ xCb ][ yCb ][ 1 ]   (569)

- If RefPicList[ 0 ][ refIdxL0 ] is not an LTRP and RefPicList[ 1 ][ refIdxL1 ] is not an LTRP, the following applies:

td = Clip3( −128, 127, currPocDiffL0 )   (570)

tb = Clip3( −128, 127, currPocDiffL1 )   (571)

tx = ( 16384 + ( Abs( td ) >> 1 ) ) / td   (572)

distScaleFactor = Clip3( −4096, 4095, ( tb * tx + 32 ) >> 6 )   (573)

mMvdL1[ 0 ] = Clip3( $-2^{17}$, $2^{17}$ − 1, (distScaleFactor * mMvdL0[ 0 ] + 128 − ( distScaleFactor * mMvdL0[ 0 ] >= 0 ) ) >> 8 )   (574)

mMvdL1[ 1 ] = Clip3( $-2^{17}$, $2^{17}$ − 1, (distScaleFactor * mMvdL0[ 1 ] + 128 − ( distScaleFactor * mMvdL0[ 1 ] >= 0 ) ) >> 8 )   (575)

- Otherwise, the following applies:

mMvdL1[ 0 ] = Sign( currPocDiffL0 ) == Sign( currPocDiffL1 ) ? mMvdL0[ 0 ] : −mMvdL0[ 0 ]   (576)

mMvdL1[ 1 ] = Sign( currPocDiffL0 ) == Sign( currPocDiffL1 ) ? mMvdL0[ 1 ] : −mMvdL0[ 1 ]   (577)

FIG. 40

- Otherwise (Abs( currPocDiffL0 ) is less than Abs( currPocDiffL1 ) and Sign( currPocDiffL0 ) is not equal to 0), the following applies:

$$mMvdL1[\ 0\ ] = MmvdOffset[\ xCb\ ][\ yCb\ ][\ 0\ ] \quad (578)$$

$$mMvdL1[\ 1\ ] = MmvdOffset[\ xCb\ ][\ yCb\ ][\ 1\ ] \quad (579)$$

- If RefPicList[ 0 ][ refIdxL0 ] is not an LTRP and RefPicList[ 1 ][ refIdxL1 ] is not an LTRP, the following applies:

$$td = Clip3(\ -128,\ 127,\ currPocDiffL1\ ) \quad (580)$$

$$tb = Clip3(\ -128,\ 127,\ currPocDiffL0\ ) \quad (581)$$

$$tx = (\ 16384 + (\ Abs(\ td\ ) >> 1\ )\ ) / td \quad (582)$$

$$distScaleFactor = Clip3(\ -4096,\ 4095,\ (\ tb * tx + 32\ ) >> 6\ ) \quad (583)$$

$$mMvdL0[\ 0\ ] = Clip3(\ -2^{17},\ 2^{17} - 1,\ (distScaleFactor * mMvdL1[\ 0\ ] + 128 - (distScaleFactor * mMvdL1[\ 0\ ] >= 0)\ ) >> 8\ ) \quad (584)$$

$$mMvdL0[\ 1\ ] = Clip3(\ -2^{17},\ 2^{17} - 1,\ (distScaleFactor * mMvdL1[\ 1\ ] + 128 - (distScaleFactor * mMvdL1[\ 1\ ] >= 0)\ ) >> 8\ )) \quad (585)$$

- Otherwise, the following applies:

$$mMvdL0[\ 0\ ] = Sign(\ currPocDiffL0\ ) == Sign(\ currPocDiffL1\ ) ? mMvdL1[\ 0\ ] : -mMvdL1[\ 0\ ] \quad (586)$$

$$mMvdL0[\ 1\ ] = Sign(\ currPocDiffL0\ ) == Sign(\ currPocDiffL1\ ) ? mMvdL1[\ 1\ ] : -mMvdL1[\ 1\ ] \quad (587)$$

3920

- Otherwise ( predFlagL0 or predFlagL1 are equal to 1 ), the following applies for X being 0 and 1:

$$mMvdLX[\ 0\ ] = (\ predFlagLX == 1\ ) ? MmvdOffset[\ xCb\ ][\ yCb\ ][\ 0\ ] : 0 \quad (588)$$

$$mMvdLX[\ 1\ ] = (\ predFlagLX == 1\ ) ? MmvdOffset[\ xCb\ ][\ yCb\ ][\ 1\ ] : 0 \quad (589)$$

FIG. 41

The variable currPic specifies the current picture.
The luma merge motion vector differences mMvdL0 and mMvdL1 are derived as follows:

- If both predFlagL0 and predFlagL1 are equal to 1, the following applies:

currPocDiffL0 = DiffPicOrderCnt( currPic, RefPicList[ 0 ][ refIdxL0 ] )  (562)

currPocDiffL1 = DiffPicOrderCnt( currPic, RefPicList[ 1 ][ refIdxL1 ] )  (563)

- If currPocDiffL0 is equal to currPocDiffL1, the following applies:

mMvdL0[ 0 ] = MmvdOffset[ xCb ][ yCb ][ 0 ]  (564)

mMvdL0[ 1 ] = MmvdOffset[ xCb ][ yCb ][ 1 ]  (565)

mMvdL1[ 0 ] = MmvdOffset[ xCb ][ yCb ][ 0 ]  (566)

mMvdL1[ 1 ] = MmvdOffset[ xCb ][ yCb ][ 1 ]  (567)

- Otherwise, if Abs( currPocDiffL0 ) is greater than or equal to Abs( currPocDiffL1 ), the following applies:

mMvdL0[ 0 ] = MmvdOffset[ xCb ][ yCb ][ 0 ]  (568)

mMvdL0[ 1 ] = MmvdOffset[ xCb ][ yCb ][ 1 ]  (569)

- If RefPicList[ 0 ][ refIdxL0 ] is not an LTRP and RefPicList[ 1 ][ refIdxL1 ] is not an LTRP, the following applies:

td = Clip3( −128, 127, currPocDiffL0 )  (570)

tb = Clip3( −128, 127, currPocDiffL1 )  (571)

tx = ( 16384 + ( Abs( td ) >> 1 ) ) / td  (572)

distScaleFactor = Clip3( −4096, 4095, ( tb * tx + 32 ) >> 6 )  (573)

mMvdL1[ 0 ] = Clip3( $-2^{17}$, $2^{17} - 1$, (distScaleFactor * mMvdL0[ 0 ] +  (574)
                            128 − ( distScaleFactor * mMvdL0[ 0 ] >= 0 ) ) >> 8 )

mMvdL1[ 1 ] = Clip3( $-2^{17}$, $2^{17} - 1$, (distScaleFactor * mMvdL0[ 1 ] +  (575)
                            128 − ( distScaleFactor * mMvdL0[ 1 ] >= 0 ) ) >> 8 )

4110 —
        - Otherwise, if Sign( currPocDiffL1 ) is equal to 0, the following applies:

mMvdL1[ 0 ] = 0  (xxx)

mMvdL1[ 1 ] = 0  (xxx)

- Otherwise, the following applies:

mMvdL1[ 0 ] = Sign( currPocDiffL0 ) == Sign( currPocDiffL1 ) ?
                            mMvdL0[ 0 ] : −mMvdL0[ 0 ]  (576)

mMvdL1[ 1 ] = Sign( currPocDiffL0 ) == Sign( currPocDiffL1 ) ?
                            mMvdL0[ 1 ] : −mMvdL0[ 1 ]  (577)

FIG. 42

- Otherwise (Abs( currPocDiffL0 ) is less than Abs( currPocDiffL1 ), the following applies:

$$mMvdL1[\ 0\ ] = MmvdOffset[\ xCb\ ][\ yCb\ ][\ 0\ ] \tag{578}$$

$$mMvdL1[\ 1\ ] = MmvdOffset[\ xCb\ ][\ yCb\ ][\ 1\ ] \tag{579}$$

- If RefPicList[ 0 ][ refIdxL0 ] is not an LTRP and RefPicList[ 1 ][ refIdxL1 ] is not an LTRP, the following applies:

$$td = Clip3(\ -128,\ 127,\ currPocDiffL1\ ) \tag{580}$$

$$tb = Clip3(\ -128,\ 127,\ currPocDiffL0\ ) \tag{581}$$

$$tx = (\ 16384 + (\ Abs(\ td\ ) >> 1\ )\ )\ /\ td \tag{582}$$

$$distScaleFactor = Clip3(\ -4096,\ 4095,\ (\ tb * tx + 32\ ) >> 6\ ) \tag{583}$$

$$mMvdL0[\ 0\ ] = Clip3(\ -2^{17},\ 2^{17} - 1,\ (distScaleFactor * mMvdL1[\ 0\ ] + \\ 128 - (distScaleFactor * mMvdL1[\ 0\ ] >= 0)\ ) >> 8\ ) \tag{584}$$

$$mMvdL0[\ 1\ ] = Clip3(\ -2^{17},\ 2^{17} - 1,\ ,\ (distScaleFactor * mMvdL1[\ 1\ ] + \\ 128 - (distScaleFactor * mMvdL1[\ 1\ ] >= 0)\ ) >> 8\ )) \tag{585}$$

4120 —
- Otherwise, if Sign( currPocDiffL0 ) is equal to 0, the following applies:

$$mMvdL0[\ 0\ ] = 0 \tag{xxx}$$

$$mMvdL0[\ 1\ ] = 0 \tag{xxx}$$

- Otherwise, the following applies:

$$mMvdL0[\ 0\ ] = Sign(\ currPocDiffL0\ ) == Sign(\ currPocDiffL1\ )\ ? \\ mMvdL1[\ 0\ ] : -mMvdL1[\ 0\ ] \tag{586}$$

$$mMvdL0[\ 1\ ] = Sign(\ currPocDiffL0\ ) == Sign(\ currPocDiffL1\ )\ ? \\ mMvdL1[\ 1\ ] : -mMvdL1[\ 1\ ] \tag{587}$$

- Otherwise ( predFlagL0 or predFlagL1 are equal to 1 ), the following applies for X being 0 and 1:

$$mMvdLX[\ 0\ ] = (\ predFlagLX == 1\ )\ ?\ MmvdOffset[\ xCb\ ][\ yCb\ ][\ 0\ ] : 0 \tag{588}$$

$$mMvdLX[\ 1\ ] = (\ predFlagLX == 1\ )\ ?\ MmvdOffset[\ xCb\ ][\ yCb\ ][\ 1\ ] : 0 \tag{589}$$

IMAGE ENCODING/DECODING METHOD AND DEVICE HAVING MOTION INFORMATION DETERMINED ON BASIS OF INTERLAYER PREDICTION, AND METHOD FOR TRANSMITTING BITSTREAM

CROSS-REFERENCE TO RELATED APPLICATIONS

This application is a National Stage application under 35 U.S.C. § 371 of International Application No. PCT/KR2021/006338, filed on May 21, 2021, which claims the benefit of U.S. Provisional Application No. 63/028,541, filed on May 21, 2020. The disclosures of the prior applications are hereby incorporated by reference herein in their entirety.

TECHNICAL FIELD

The present disclosure relates to an image encoding/decoding method and apparatus, and, more particularly, to an image encoding and decoding method and apparatus for determining motion information based on whether a reference picture is an inter-layer reference picture and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency.

Another object of the present disclosure is to provide an image encoding/decoding method and apparatus for improving encoding/decoding efficiency by determining motion prediction information based on whether a reference picture type is an inter-layer prediction type.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure. For example, a bitstream that causes the decoding apparatus according to the present disclosure to perform the image decoding method according to the present disclosure may be stored in the recording medium.

The technical problems solved by the present disclosure are not limited to the above technical problems and other technical problems which are not described herein will become apparent to those skilled in the art from the following description.

An image decoding method performed by an image decoding apparatus according to an aspect of the present disclosure may comprise determining a motion vector and decoding a current block based on the motion vector. The motion vector may be determined based on at least one of a first reference picture type of a first reference picture corresponding to the current block or a second reference picture type of a second reference picture corresponding to an inter-layer corresponding block.

The first reference picture may be restricted to belong to the same layer as a current picture to which the current block belongs, and the second reference picture may be restricted to belong to the same layer as a picture to which the inter-layer corresponding block belongs.

The motion vector may be determined based on a temporal motion candidate, a reference picture type may indicate any one of a short-term reference picture type, a long-term reference picture type and an inter-layer reference picture type, and, based on at least one of the first reference picture type or the second reference picture type being an inter-layer picture reference picture type, the temporal motion candidate may be set to a value indicating that a temporal motion candidate is not used.

The first reference picture may be restricted to belong to a different layer than a current picture to which the current block belongs, and the second reference picture may be restricted to belong to a different layer than a picture to which the inter-layer corresponding block belongs.

The motion vector may be determined based on a temporal motion candidate, a reference picture type may indicate any one of a short-term reference picture type, a long-term reference picture type and an inter-layer reference picture type, and, based on the first reference picture type and the second reference picture type having different values, the temporal motion candidate may be set to a value indicating that a temporal motion candidate is not used.

The motion vector may be determined based on a temporal motion candidate, and the temporal motion vector may be determined based on whether the second reference picture type is a reference picture type referencing a long-term reference picture of the same layer.

The motion vector may be determined based on a temporal motion candidate, the temporal motion candidate may be derived based on based on neither the first reference picture type nor the second reference picture type being a reference picture type referencing a long-term reference picture of the same layer, and, based on the inter-layer corresponding block and the second reference picture belonging to the same layer, the temporal motion candidate may be derived by applying scaling.

The motion vector may be determined based on a temporal motion candidate, a reference picture type may indicate any one of a short-term reference picture type, a long-term reference picture type and an inter-layer reference picture type, and, based on the first reference picture type and the second reference picture type having different values and neither the first reference picture type nor the second reference picture type being an inter-layer picture reference picture, the temporal motion candidate may be set to a value indicating that a temporal motion candidate is not used.

The motion vector may be determined based on a motion vector offset, and the motion vector offset may be determined based on whether the first reference picture type is an inter-layer reference picture type.

Whether the first reference picture type is an inter-layer reference picture type may be identified based on a picture order count (POC) difference between a current picture to which the current block belongs and the first reference picture being 0.

Based on the POC difference between the current picture to which the current block belongs and the first reference picture being 0, a value of a motion vector offset for the first reference picture may be determined to be a positive value.

Based on the POC difference between the current picture to which the current block belongs and the first reference picture being 0, a value of a motion vector offset for the first reference picture may be determined to be 0.

Also, an image decoding apparatus may comprise a memory and at least one processor. The at least one processor may determine a motion vector and decode a current block based on the motion vector. The motion vector may be determined based on at least one of a first reference picture type of a first reference picture corresponding to the current block or a second reference picture type of a second reference picture corresponding to an inter-layer corresponding block.

Also, an image encoding method performed by an image encoding apparatus according to another aspect of the present disclosure may comprise determining a motion vector and encoding a current block based on the motion vector. The motion vector may be determined based on at least one of a first reference picture type of a first reference picture corresponding to the current block or a second reference picture type of a second reference picture corresponding to an inter-layer corresponding block.

Also, a transmission method according to another aspect of the present disclosure may transmit a bitstream generated by an image encoding apparatus or method according to the present disclosure.

Also, a computer-readable recording medium according to another aspect of the present disclosure may store a bitstream generated by an image encoding method or apparatus according to the present disclosure.

Also, a computer-readable recording medium according to another aspect of the present disclosure may store a bitstream for enabling a decoding apparatus to perform the image decoding method according to the present disclosure.

The features briefly summarized above with respect to the present disclosure are merely exemplary aspects of the detailed description below of the present disclosure, and do not limit the scope of the present disclosure.

According to the present disclosure, it is possible to provide an image encoding/decoding method and apparatus with improved encoding/decoding efficiency.

Also, according to the present disclosure, it is possible to provide an image encoding/decoding method and apparatus for improving encoding/decoding efficiency by determining motion prediction information based on whether a reference picture type is an inter-layer prediction type.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF DRAWINGS

FIGS. 9 to 15 are views illustrating a motion information derivation method according to an embodiment.

FIGS. 16 to 32 are views illustrating embodiments of deriving TMVP.

FIGS. 33 to 42 are views illustrating embodiments of deriving an MMVD offset.

DETAILED DESCRIPTION

Figure 1:
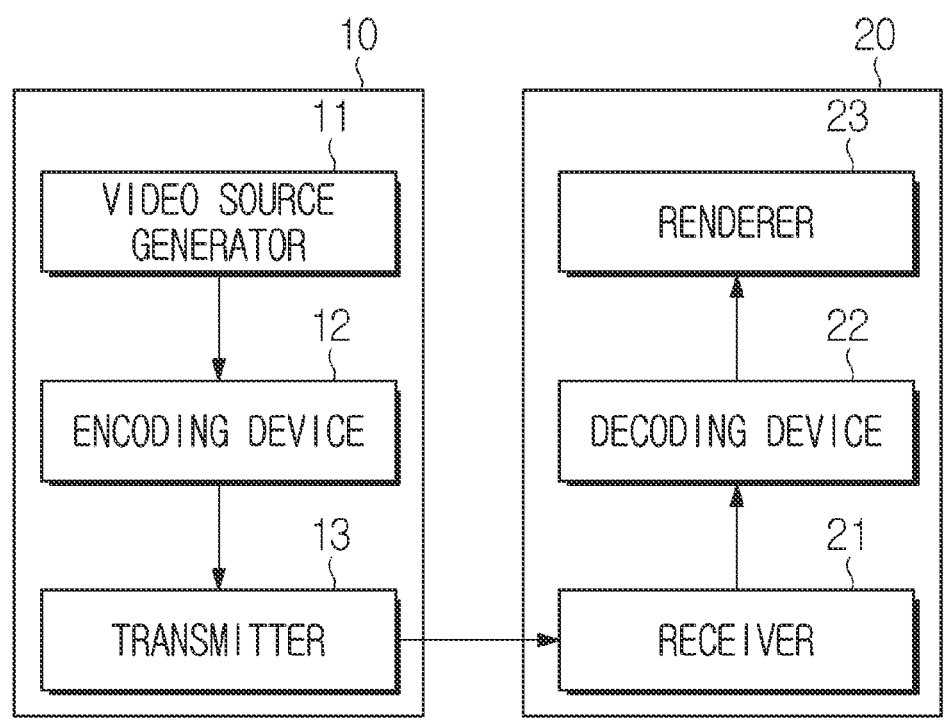
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

Method/embodiments disclosed in the present disclosure are applicable to methods disclosed in the versatile video coding (VVC) standard. In addition, method/embodiments disclosed in the present disclosure are applicable to methods disclosed in the essential video coding (FVC) standard, the AOMedia Video 1 (AV1) standard, the 2nd generation of audio video coding standard (AVS2) or the next-generation video/image coding standard (e.g., .267 or H.268).

In the present disclosure, various embodiments of video/image coding are provided and embodiments of the present disclosure, which are not described, may be performed in combination.

In the present disclosure, a "video" may mean a set of images over time. A "picture" generally refers to a unit representing one image at a specific time, and a slice/tile is a coding unit constituting a portion of a picture in coding. A slice/tile may include one or more coding tree units (CTUs). The CTU may be partitioned into one or more CUs.

One picture may consist of one or more slices/tiles. A tile is a rectangular area within a particular tile row and a particular tile column in a picture and may consist of a plurality of CTUs. The tile column may be defined as a rectangular area of CTUs and may have a height equal to the height of the picture and a width specified by a syntax element signaled from a bitstream portion such as a picture parameter set. The tile row may be defined as a rectangular area of CTUs and may have a width equal to the width of the picture and a height specified by a syntax element signaled from a bitstream portion such as a picture parameter set.

A tile scan is a specific sequential ordering of CTUs partitioning a picture. Here, the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture. The slice may be exclusively contained in a single NAL unit.

One picture may be partitioned into two or more subpictures. The subpicture may be a rectangular region of one or more slices in the picture.

One picture may include one or more tile groups. One tile group may include one or more tiles. A brick may represent a rectangular region of CTU rows within a tile in a picture. One tile may include one or more bricks. The brick may represent a rectangular region of CTU rows in a tile. One tile may be partitioned into a plurality of bricks and each brick may include one or more CTU rows belonging to a tile. A tile which is not partitioned into a plurality of bricks may also be treated as a brick.

A "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a lama component or only a pixel/pixel value of a chroma component.

In the present disclosure, a "unit" may represent a basic unit of image processing. The unit may include at least one of a specific region of the picture and information related to the region. One unit may include one luma block and two chroma blocks (e.g., Cb and Cr). The unit may be used interchangeably with the terms such as "sample array", "block" or "area" in some cases. In a general case, an M×N block may include a set (or array) of samples (or a sample array) or transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

In the present disclosure, "at least one of A and B" may mean "only A", "only B" or "both A and B". In addition, in the disclosure, "at least one of A or B" or "at least one of A and/or B" may be interpreted as being the same as "at least one of A and B".

In addition, in the present disclosure, "at least one of A, B and C" may mean "only A", "only B", "only C" or "any combination of A, B and C". In addition, in the disclosure, "at least one of A, B or C" or "at least one of A, B and/or C" may be interpreted as being the same as "at least one of A, B and C".

In addition, parentheses used in the present disclosure may mean "for example". Specifically, when "prediction (intra prediction)" is described, "intra prediction" may be proposed as an example of "prediction". In other words, "prediction" of the present disclosure is not limited to "intra prediction" and "intra prediction" may be proposed as an example of "prediction". In addition, even when "prediction (that is, intra prediction)" is described, "intra prediction" may be proposed as an example of "prediction".

In the present disclosure, technical features individually described in one drawing may be implemented individually or simultaneously.

Overview of Video Coding System

FIG. 1 is a view showing a video coding system according to the present disclosure.

The video coding system according to an embodiment may include a source device 10 and a reception device 20. The source device 10 may deliver encoded video and/or image information or data to the reception device 20 in the form of a file or streaming via a digital storage medium or network.

The source device 10 according to an embodiment may include a video source generator 11, an encoding device 12 and a transmitter 13. The reception device 20 according to an embodiment may include a receiver 21, a decoding device 22 and a renderer 23. The encoding device 12 may be called a video/image encoding device, and the decoding device 22 may be called a video/image decoding device. The transmitter 13 may be included in the encoding device 12. The receiver 21 may be included in the decoding device 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding device 12 may encode an input video/image. The encoding device 12 may perform a series of procedures such as prediction, transform, and quantization for compression and coding efficiency. The encoding device 12 may output encoded data (encoded video/image information) in the form of a bitstream.

The transmitter 13 may transmit the encoded video/image information or data output in the form of a bitstream to the receiver 21 of the reception device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding device 22.

The decoding device 22 may decode the video/image by performing a series of procedures such as dequantization, inverse transform, and prediction corresponding to the operation of the encoding device 12.

The renderer 23 may render the decoded video/image. The rendered video/image may be displayed through the display.

Overview of Image Encoding Apparatus

Figure 2:
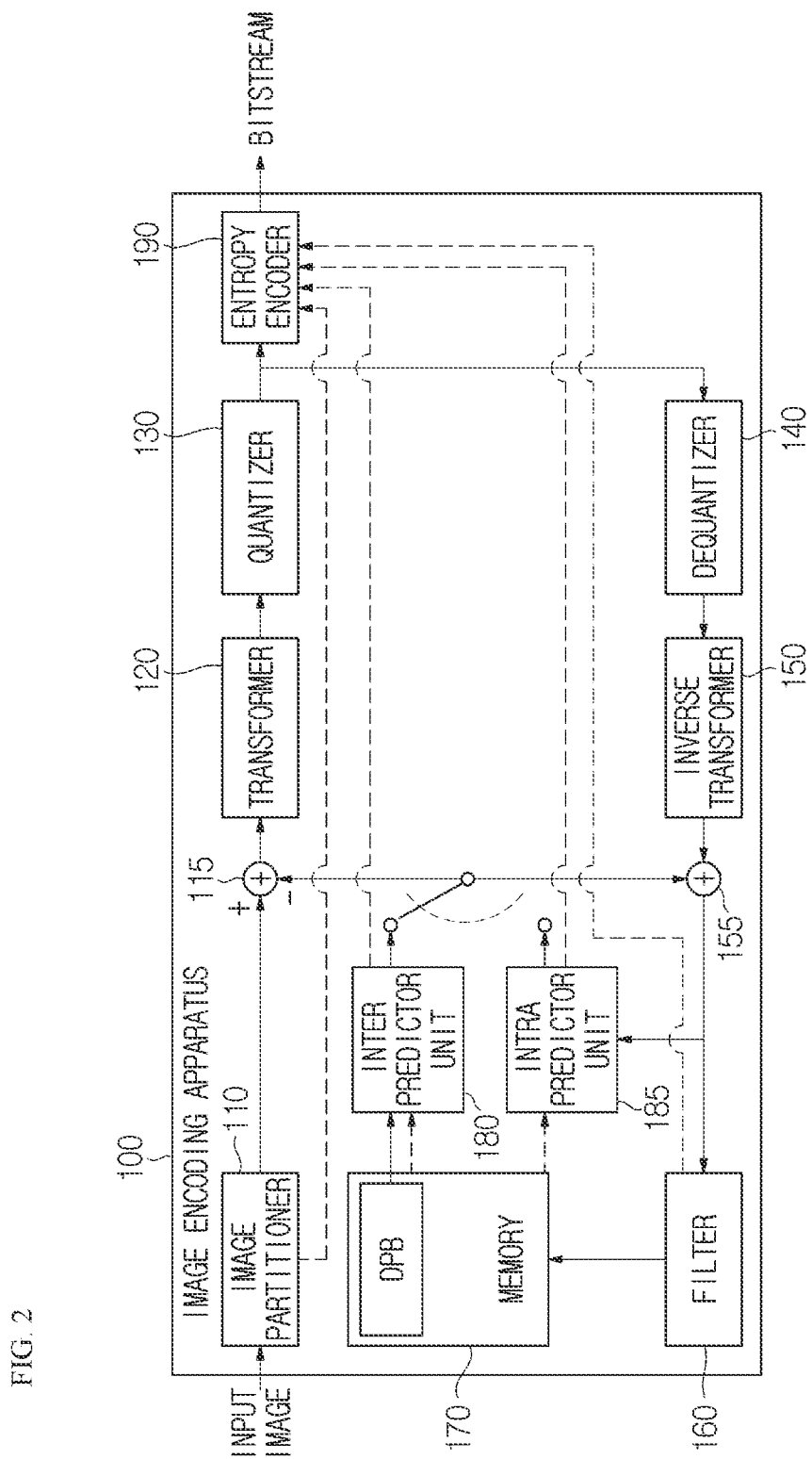
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image source device 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image source device 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image source device 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PLS) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image source device 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image source device 100, prediction mismatch between the image source device 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
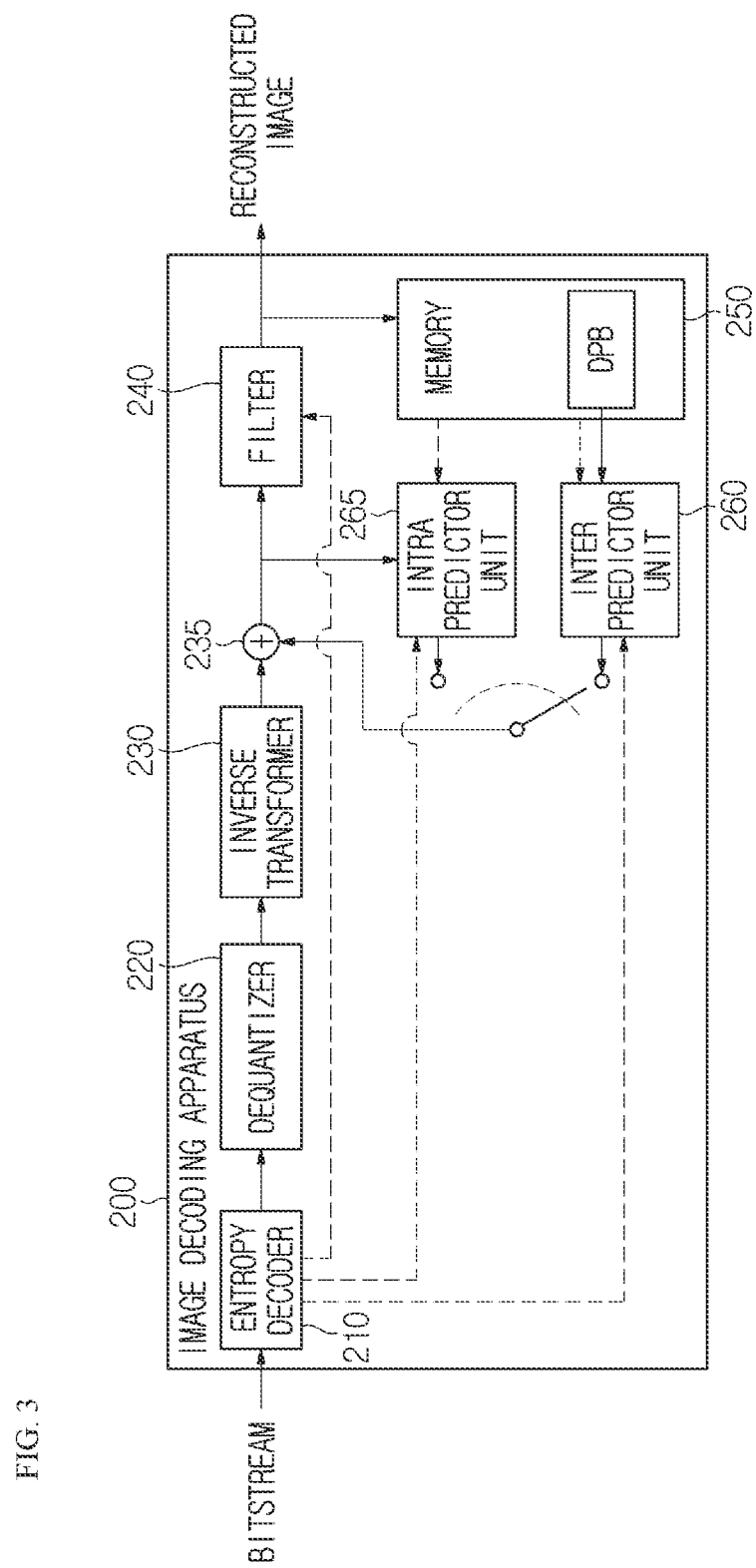
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image reception device 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image reception device 200 may be configured by a hardware component (e.g., a decoder or a processor) according to an embodiment. In addition, the memory 250 may include a decoded picture buffer (DPB) or may be configured by a digital storage medium.

The image reception device 200, which has received a bitstream including video/image information, may reconstruct an image by performing a process corresponding to a process performed by the image source device 100 of FIG. 2. For example, the image reception device 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image reception device 200 may be reproduced through a reproducing apparatus (not shown).

The image reception device 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image reception device 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image source device 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image source device 100 may be equally or correspondingly applied to the filter 240, the inter predictor 260, and the intra predictor 265 of the image reception device 200.

General Image/Video Coding Procedure

In image/video coding, a picture configuring an image/video may be encoded/decoded according to a decoding order. A picture order corresponding to an output order of the decoded picture may be set differently from the decoding order, and, based on this, not only forward prediction but also backward prediction may be performed during inter prediction.

Figure 4:
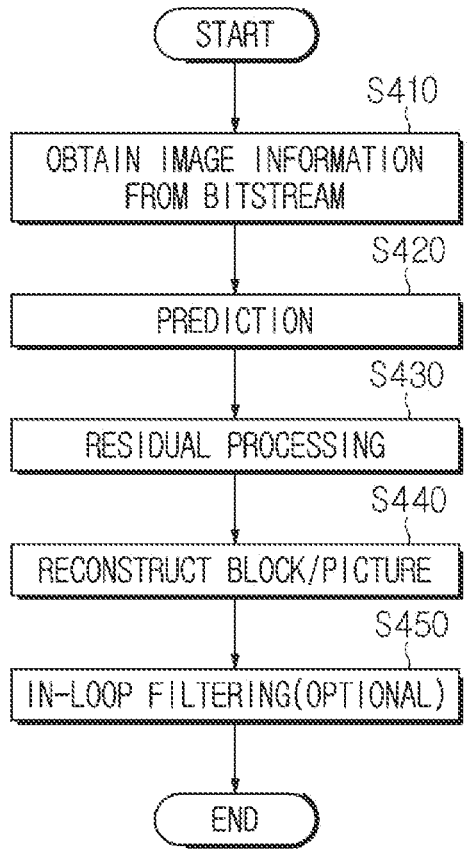
FIGS. 4 and 5 are views showing an example of a picture decoding and encoding procedure according to an embodiment.

FIG. 4 shows an example of a schematic picture decoding procedure, to which embodiment(s) of the present disclosure is applicable. In FIG. 4, S410 may be performed in the entropy decoder 210 of the decoding apparatus, S420 may be performed in a predictor including the intra predictor 265 and the inter predictor 260, S430 may be performed in a residual processor including the dequantizer 220 and the inverse transformer 230, S440 may be performed in the adder 235, and S450 may be performed in the filter 240. S410 may include the information decoding procedure described in the present disclosure, S420 may include the inter/intra prediction procedure described in the present disclosure, S430 may include a residual processing procedure described in the present disclosure, S440 may include the block/picture reconstruction procedure described in the present disclosure, and S450 may include the in-loop filtering procedure described in the present disclosure.

Referring to FIG. 4, the picture decoding procedure may schematically include a procedure (S410) for obtaining image/video information (through decoding) from a bitstream, a picture reconstruction procedure (S420 to S440) and an in-loop filtering procedure (S450) for a reconstructed picture. The picture reconstruction procedure may be performed based on prediction samples and residual samples obtained through inter/intra prediction (S420) and residual processing (S430) (dequantization and inverse transform of the quantized transform coefficient) described in the present disclosure. A modified reconstructed picture may be generated through the in-loop filtering procedure for the reconstructed picture generated through the picture reconstruction procedure, the modified reconstructed picture may be output as a decoded picture, stored in a decoded picture buffer or memory 250 of the decoding apparatus and used as a reference picture in the inter prediction procedure when decoding the picture later. In some cases, the in-loop filtering procedure may be omitted. In this case, the reconstructed picture may be output as a decoded picture, stored in a decoded picture buffer or memory 250 of the decoding apparatus, and used as a reference picture in the inter prediction procedure when decoding the picture later. The in-loop filtering procedure (S450) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may be similarly performed even in the encoding apparatus.

Figure 5:
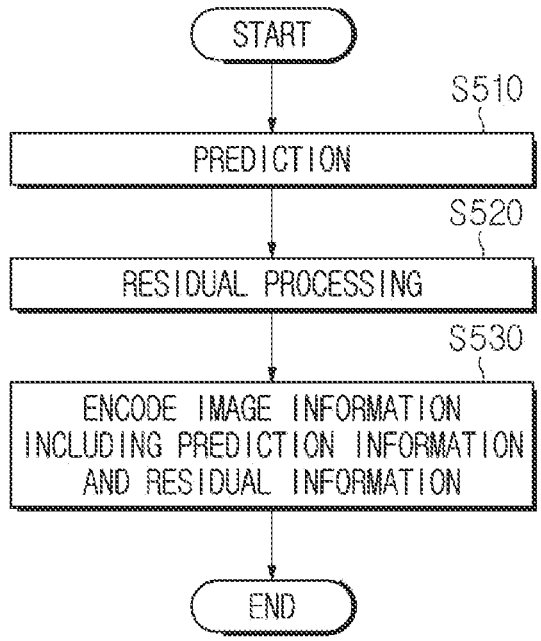
Figure 6:
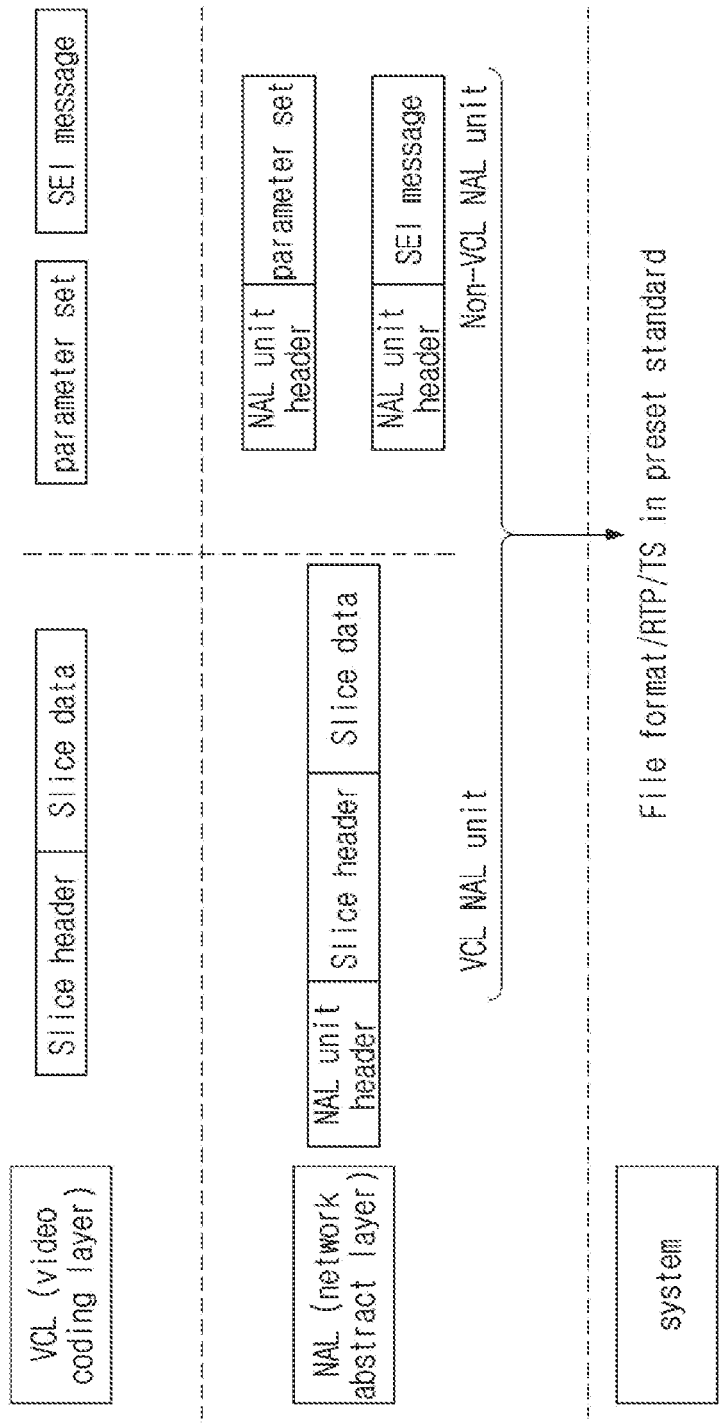
FIG. 6 is a view showing a layer structure for a coded image according to an embodiment.

FIG. 5 shows an example of a schematic picture encoding procedure, to which embodiment(s) of the present disclosure is applicable. In FIG. 5, S510 may be performed in the predictor including the intra predictor 185 or inter predictor 180 of the encoding apparatus described above with reference to FIG. 2, S520 may be performed in a residual processor including the transformer 120 and/or the quantizer 130, and S530 may be performed in the entropy encoder 190. S510 may include the inter/intra prediction procedure described in the present disclosure, S520 may include the residual processing procedure described in the present disclosure, and S530 may include the information encoding procedure described in the present disclosure.

Referring to FIG. 5, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture, as described with respect to FIG. 2. The encoding apparatus may derive (modified) residual samples from a quantized transform coefficient through the dequantizer 140 and the inverse transformer 150, and generate the reconstructed picture based on the prediction samples which are output of S510 and the (modified) residual samples. The reconstructed picture generated in this way may be equal to the reconstructed picture generated in the decoding apparatus. The modified reconstructed picture may be generated through the in-loop filtering procedure for the reconstructed picture, may be stored in the decoded picture buffer or memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during image/video coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the decoding apparatus but also in the encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. Meanwhile, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to the luma component and the chroma component unless explicitly limited in the present disclosure.

Example of Coding Layer and Structure

A coded video/image according to the present disclosure may be processed, for example, according to a coding layer and structure which will be described below.

Figure 20:
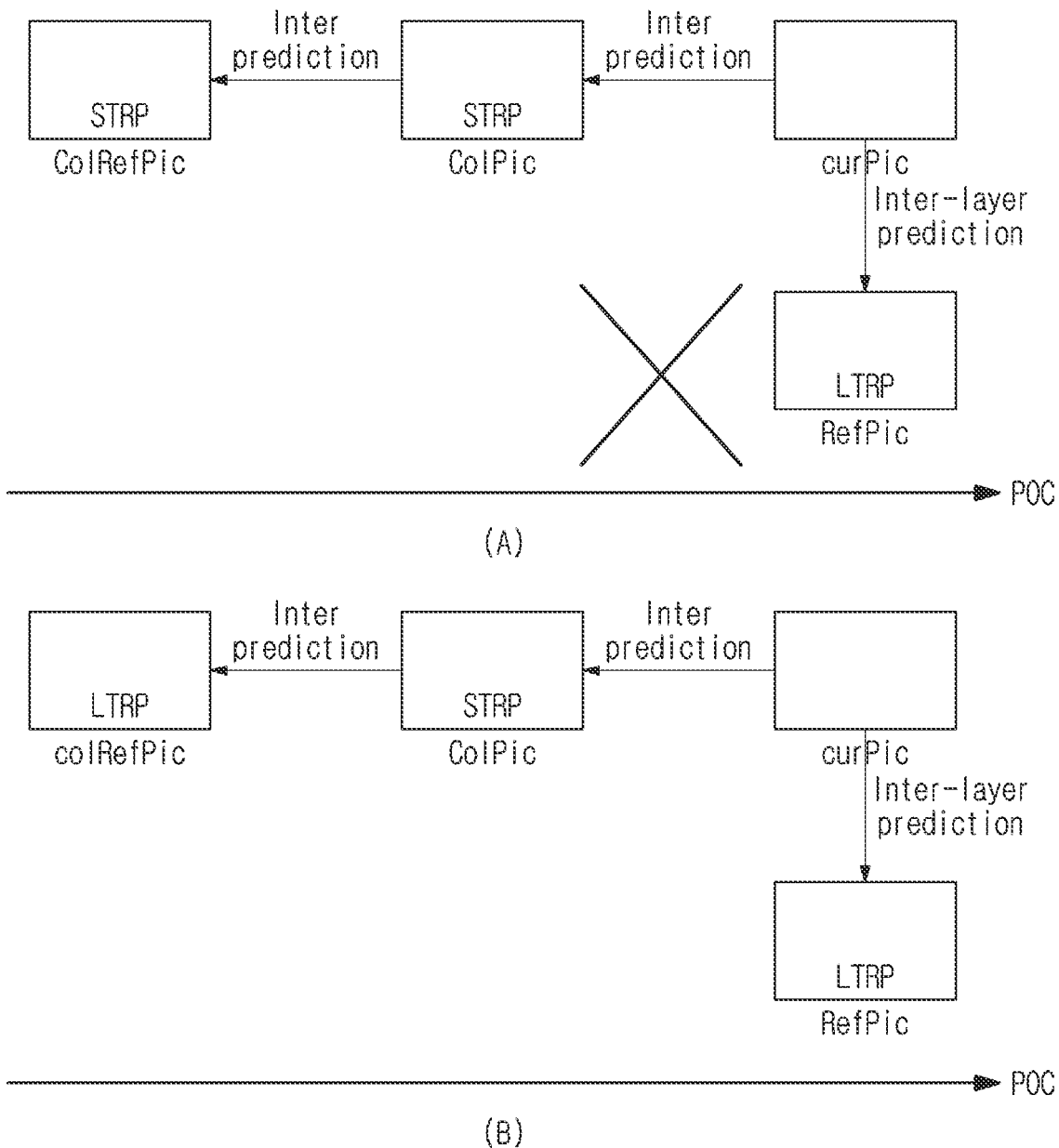

FIG. 20 is a view showing a layer structure for a coded image. The coded image may be classified into a video coding layer (VCL) for an image decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate an NAL unit. In this case, the RBSP refers to slice data, a parameter set, an SEI message generated in the VCL. The NAL unit header may include NAL unit type information specified according to RBSP data included in a corresponding NAL unit.

As shown in the figure, the NAL unit may be classified into a VCL NAL unit and a non-VCL NAL unit according to the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled.

For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set/information included in the Non-VCL NAL unit type will be listed below.

DCI (Decoding capability information) NAL unit: Type for NAL unit including DCI

VPS (Video Parameter Set) NAL unit: Type for NAL unit including VPS

SPS (Sequence Parameter Set) NAL unit: Type fir NAL unit including SPS

PPS (Picture Parameter Set) NAL unit: Type for NAL unit including PPS

APS (Adaptation Parameter Set) NAL unit: Type for NAL unit including APS

PH (Picture header) NAL unit: Type for NAL unit including PH.

The above-described NAL unit types may have syntax information for a NAL unit type, and the syntax information may be stored in a NAL unit header and signaled. For example, the syntax information may be nal_unit_type, and the NAL unit types may be specified as nal_unit_type values.

Meanwhile, as described above, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters commonly applicable to an overall video. The DCI may include information/parameters related to decoding capability. In the present disclosure, a high level syntax (HLS) may include at least one of the APS syntax, the PPS syntax, the SPS syntax, the VPS syntax, the DCI syntax, the picture header syntax or the slice header syntax. Meanwhile, in the present disclosure, a low level syntax (LLS) may include, for example, a slice data syntax, a CTU syntax, a coding unit syntax, a transform unit syntax, etc.

In the present disclosure, image/video information encoded in the encoding apparatus and signaled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the image/video information may further include general constraint information and/or information on a NAL unit header.

Multi-Layer Based Coding

Image/video coding according to the present disclosure may include multi-layer based image/video coding. The multi-layer based image/video coding may include scalable coding. In multi-layer based coding or scalable coding, input signals may be processed for each layer. According to the layer, input signals (input images/videos) may have different values in terms of at least one of resolution, frame rate, bit-depth, color format, aspect ratio or view. In this case, it is possible to reduce redundant information transmission/processing and to increase compression efficiency, by performing inter-layer prediction using a difference between layers (e.g., based on scalability).

Figure 7:
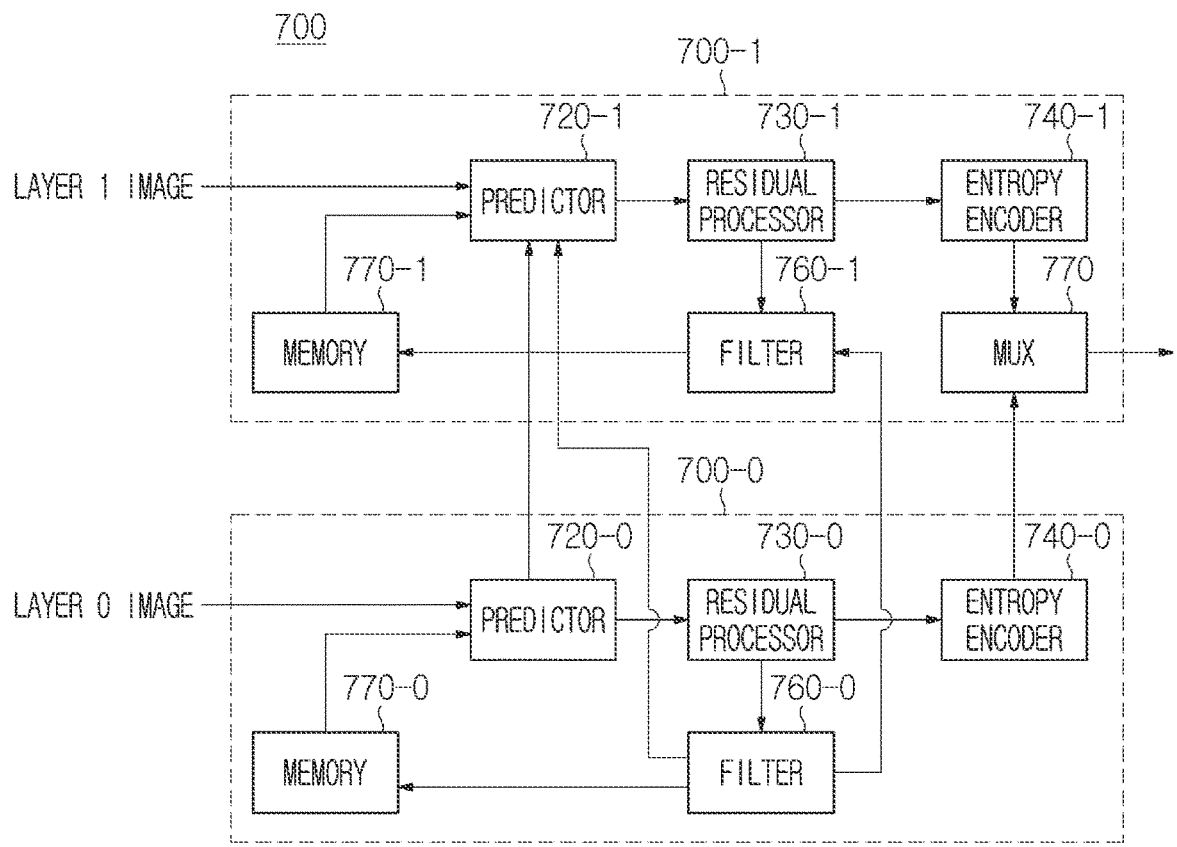
FIGS. 7 to 8 are views illustrating multi-layer based encoding and decoding.

FIG. 7 is a schematic block diagram of a multi-layer encoding apparatus 700, to which embodiment(s) of the present disclosure is applicable, and, in which encoding of a multi-layer video/image signal is performed.

The multi-layer encoding apparatus 700 of FIG. 7 may include the encoding apparatus of FIG. 2. Compared to FIG. 2, the image partitioner 110 and the adder 155 are not shown in the multi-layer encoding apparatus 700 of FIG. 7, the multi-layer encoding apparatus 700 may include the image partitioner 110 and the adder 155. In an embodiment, the image partitioner 110 and the adder 155 may be included in unit of layer. Hereinafter, multi-layer based prediction will be focused upon in the description of FIG. 7. For example, in addition to the following description, the multi-layer encoding apparatus 700 may include the technical idea of the encoding apparatus described above with reference to FIG. 2.

For convenience of description, a multi-layer structure consisting of two layers is shown in FIG. 7. However, the embodiments of the present disclosure are not limited to two layers and the multi-layer structure, to which the embodiment of the present disclosure is applied, may include two or more layers.

Referring to FIG. 7, the encoding apparatus 700 includes an encoder 700-1 of layer 1 and an encoder 700-0 of layer 0. Layer 0 may be a base layer, a reference layer or a lower layer, and layer 1 may be an enhancement layer, a current layer or a higher layer.

The encoder 700-1 of layer 1 may include a predictor 720-1, a residual processor 730-1, a filter 760-1, a memory 710-1, an entropy encoder 740-1 and a multiplexer (MUX) 770. In an embodiment, the MUX may be included as an external component.

The encoder 700-0 of layer 0 may include a predictor 720-0, a residual processor 730-0, a filter 760-0, a memory 710-0 and an entropy encoder 740-0.

The predictors 720-0 and 720-1 may perform prediction with respect to input images based on various prediction schemes as described above. For example, the predictors 720-0 and 720-1 may perform inter prediction and intra prediction. The predictors 720-0 and 720-1 may perform prediction in a predetermined processing unit. The prediction unit may be a coding unit (CU) or a transform unit (TU). A predicted block (including prediction samples) may be generated according to the result of prediction and, based on this, the residual processor may derive a residual block (including residual samples).

Through inter prediction, prediction may be performed based on information on at least one of a previous picture and/or a next picture of a current picture, thereby generating a prediction block. Through intra prediction, prediction may be performed based on neighboring samples in a current picture, thereby generating a prediction block.

As an inter prediction mode or method, the above-described various prediction modes or methods may be used. In inter prediction, a reference picture may be selected for a current block to be predicted, and a reference block corresponding to the current block may be selected from the reference picture. The predictors 720-0 and 720-1 may generate a predicted block based on the reference block.

In addition, the predictor 720-1 may perform prediction for layer 1 using information on layer 0. In the present disclosure, a method of predicting information on a current layer using information on another layer is referred to as inter-layer prediction, for convenience of description.

Information on a current layer predicted using information on another layer (e.g., predicted by inter-layer prediction) may be at least one of texture, motion information, unit information or a predetermined parameter (e.g., a filtering parameter, etc.).

In addition, information on another layer used for prediction of the current layer (e.g., used for inter-layer prediction) may be at least one of texture, motion information, unit information or a predetermined parameter (e.g., a filtering parameter, etc.).

Inter-layer prediction, a current block may be a block in a current picture in a current layer (e.g., layer 1) and may be a block to be coded. A reference block is a block in a picture (reference picture) belonging to the same access unit (AU) as a picture (current picture), to which the current block belongs, on a layer (reference layer, e.g., layer 0) referred to for prediction of the current block, and may be a block corresponding to the current block.

As an example of inter-layer prediction, there is inter-layer motion prediction for predicting motion information of a current layer using motion information of a reference layer. According to inter-layer motion prediction, motion information of a current block may be predicted using motion information of a reference block. That is, in deriving motion information according to the inter prediction mode which will be described below, a motion information candidate may be derived based on motion information of an inter-layer reference block instead of a temporal neighboring block.

When inter-layer motion prediction is applied, the predictor 720-1 may scale and use reference block (that is, inter-layer reference block) motion information of the reference layer.

As another example of inter-layer prediction, inter-layer texture prediction may use texture of a reconstructed reference block as a prediction value for a current block. In this case, the predictor 720-1 may scale the texture of the reference block by up-scaling. Inter-layer texture prediction may be referred to as inter-layer (reconstructed) sample prediction or simply inter-layer prediction.

In inter-layer parameter prediction which is another example of inter-layer prediction, a derived parameter of a reference layer may be reused in a current layer or a parameter for a current layer may be derived based on a parameter used in a reference layer.

In inter-layer residual prediction which is another example of inter-layer prediction, residual information of a current layer may be predicted using residual information of another layer and, based on this, prediction of a current block may be performed.

In inter-layer difference prediction which is another example of inter-layer prediction, prediction of a current block may be performed using a difference between images obtained by up-sampling or down-sampling a reconstructed picture of a current layer and a reconstructed picture of a reference layer.

In inter-layer syntax prediction which is another example of inter-layer prediction, texture of a current block may be predicted or generated using syntax information of a reference layer. In this case, syntax information of a referenced reference layer may include information on an intra prediction mode and motion information.

A plurality of prediction methods using the above-described inter-layer may be used when predicting a particular block.

Here, as an example of inter-layer prediction, although inter-layer texture prediction, inter-layer motion prediction, inter-layer unit information prediction, inter-layer parameter prediction, inter-layer residual prediction, inter-layer difference prediction, inter-layer syntax prediction, etc. are described, inter-layer prediction applicable in the present disclosure is not limited thereto.

For example, inter-layer prediction may be applied as an extension of inter prediction for a current layer. That is, by including a reference picture derived from a reference layer in reference pictures capable of being referenced for inter prediction of a current block, it is possible to perform inter prediction for the current block.

In this case, the inter-layer reference picture may be included in a reference picture list for the current block. The predictor 720-1 may perform inter prediction for the current block using an inter-layer reference picture.

Here, the inter-layer reference picture may be a reference picture constructed by sampling the reconstructed picture of a reference layer to correspond to the current layer. Accordingly, when the reconstructed picture of the reference layer corresponds to the picture of the current layer, the reconstructed picture of the reference layer may be used as an inter-layer reference picture without sampling. For example, when the widths and heights of samples are the same in the reconstructed picture of the reference layer and the reconstructed picture of the current layer and an offset between the top left end, top right end, bottom left end and bottom right end in the picture of the reference layer and the top left end, top right end, bottom left end and bottom right end in the picture of the reference layer is 0, the reconstructed picture of the reference layer may be used as the inter-layer reference picture of the current layer without being sampled again.

In addition, the reconstructed picture of the reference layer, from which the inter-layer reference picture is derived, may be a picture belonging to the same AU as the current picture to be encoded.

When inter prediction for a current block is performed by including an inter-layer reference picture in a reference picture list, the position of the inter-layer reference picture in the reference picture list may be different between reference picture lists L0 and L1. For example, in reference picture list L0, the inter-layer reference picture may be located after short-term reference pictures before the current picture and, in reference picture list L1, the inter-layer reference picture may be located at the end of the reference picture list.

Here, reference picture list L0 is a reference picture list used for inter prediction of P slice or a reference picture list used as a first reference picture list in inter prediction of B slice. Reference picture list L1 may be a second reference picture list used for inter prediction of B slice.

Accordingly, reference picture list L0 may consist of short-term reference picture(s) before the current picture, an inter-layer reference picture, short-term reference picture(s) after the current picture and a long-term reference picture in this order. Reference picture list L1 may consist of short-term reference picture(s) after the current picture, short-term reference picture(s) before the current picture, a long-term reference picture and an inter-layer reference picture in this order.

In this case, a predictive (P) slice is a slice for which intra prediction is performed or inter prediction is performed using a maximum of one motion vector per prediction block and a reference picture index. A bi-predictive (B) slice is a slice for which intra prediction is performed or prediction is performed using a maximum of two motion vectors per prediction block and a reference picture index. In this regard, an intra (I) slice is a slice to which only intra prediction is applied.

In addition, when inter prediction for a current block is performed based on a reference picture list including an inter-layer reference picture, the reference picture list may include a plurality of inter-layer reference pictures derived from a plurality of layers.

When a plurality of inter-layer reference pictures is included, the inter-layer reference pictures may be alternately arranged in reference picture lists L0 and L1. For example, assume that two inter-layer reference pictures such as inter-layer reference picture ILRPi and inter-layer reference picture ILRPj are included in the reference picture list used for inter prediction of the current block. In this case, in reference picture list L0, ILRPi may be located after short-term reference pictures before the current picture and ILRPj may be located at the end of the list. In addition, in reference picture list L1, ILRPi may be located at the end of the list and ILRPj may be located after short-term reference pictures after the current picture.

In this case, reference picture list L0 may consist of short-term reference picture(s) before the current picture, an inter-layer reference picture ILRPi, short-term reference picture(s) after the current picture, a long-term reference picture and an inter-layer reference picture ILRPj in this order. Reference picture list L1 may consist of short-term reference picture(s) after the current picture, an inter-layer reference picture ILRPj, short-term reference picture(s) before the current picture, a long-term reference picture and an inter-layer reference picture ILRPi in this order.

In addition, one of two inter-layer reference pictures may be an inter-layer reference picture derived from a scalable layer for resolution and the other may be an inter-layer reference picture derived from a layer for providing another view. In this case, for example, if ILRPi is an inter-layer reference picture derived from a layer for providing different resolution and ILRPj is an inter-layer reference picture derived from a layer for providing a different view, in the case of scalable video coding supporting only scalability excluding a view, reference picture list L0 may consist of short-term reference picture(s) before the current picture, an inter-layer reference picture ILRPi, short-term reference picture(s) after the current picture, and a long-term reference picture in this order, and reference picture list L1 may consist of short-term reference picture(s) after the current picture, short-term reference picture(s) before the current picture, a long-term reference picture and an inter-layer reference picture ILRPi in this order.

Meanwhile, in inter-layer prediction, as information on an inter-layer reference picture, only a sample value may be used, only motion information (motion vector) may be used or both a sample value and motion information may be used. The predictor 720-1 may use only a sample value of the inter-layer reference picture, may use only motion information (motion vector) of the inter-layer reference picture or may use both the sample value and motion information of the inter-layer reference picture according to information received from the encoding apparatus, when the reference picture index indicates an inter-layer reference picture.

When only the sample value of the inter-layer reference picture is used, the predictor 220-1 may derive samples of a block specified by a motion vector from the inter-layer reference picture as a prediction sample of a current block. In the case of scalable video coding which does not take a view into consideration, a motion vector in inter prediction (inter-layer prediction) using an inter-layer reference picture may be set to a fixed value (e.g., 0).

When only the motion information of the inter-layer reference picture is used, the predictor 220-1 may use a motion vector specified by the inter-layer reference picture as a motion vector predictor for deriving the motion vector of the current block. In addition, the predictor 220-1 may use a motion vector specified by the inter-layer reference picture as the motion vector of the current block.

When both the sample value and motion information of the inter-layer reference picture are used, the predictor 220-1 may use, for prediction of the current block, a sample of a region corresponding to the current block in the inter-layer reference picture and motion information (motion vector) specified in the inter-layer reference picture.

The encoding apparatus may transmit a reference index indicating an inter-layer reference picture in a reference picture list to the decoding apparatus, when inter-layer prediction is applied, and may transmit, to the decoding apparatus, information for specifying which information (sample information, motion information or sample information and motion information) is used from the inter-layer reference picture, that is, information for specifying a dependency type of dependency for inter-layer prediction between two layers.

Figure 8:
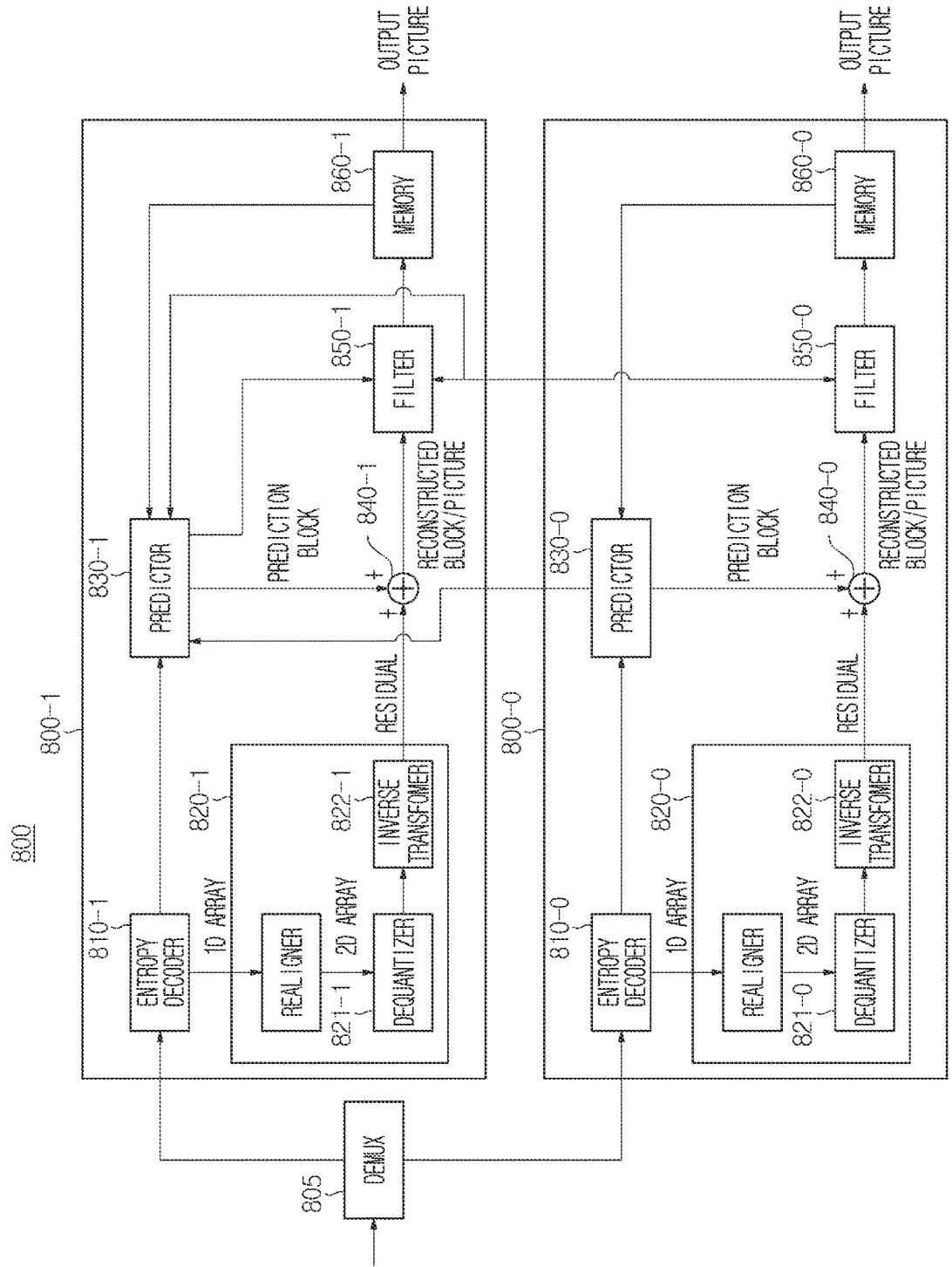

FIG. 8 is a schematic block diagram of a decoding apparatus, to which embodiment(s) of the present disclosure is applicable, and, in which decoding of a multi-layer video/image signal is performed. The decoding apparatus of FIG. 8 may include the decoding apparatus of FIG. 3. A realigner shown in FIG. 8 may be omitted or included in a dequantizer. In the description of this drawing, multi-layer based prediction will be focused upon. In addition, the description of the decoding apparatus of FIG. 3 may be included.

In the example of FIG. 8, for convenience of description, a multi-layer structure consisting of two layers will be described. However, it should be noted that embodiments of the present disclosure are not limited thereto, and the multi-layer structure, to which the embodiment of the present disclosure is applied, may include two or more layers.

Referring to FIG. 8, the decoding apparatus 800 may include a decoder 800-1 of layer 1 and a decoder 800-0 of layer 1. The decoder 800-1 of layer 1 may include an entropy decoder 810-1, a residual processor 820-1, a predictor 830-1, an adder 840-1, a filter 850-1 and a memory 860-1. The decoder 800-2 of layer 0 may include an entropy decoder 810-0, a residual processor 820-0, a predictor 830-0, an adder 840-0, a filter 850-0 and a memory 860-0.

When a bitstream including image information is received from the encoding apparatus, a DEMUX 805 may demultiplex information for each layer and transmit the information to the decoding apparatus for each layer.

The entropy decoders 810-1 and 810-0 may perform decoding in correspondence with a coding method used in the encoding apparatus. For example, when CABAC is used in the encoding apparatus, the entropy decoders 810-1 and 810-0 may perform entropy decoding using CABAC.

When a prediction mode for a current block is an intra prediction mode, the predictors 830-1 and 830-0 may perform intra prediction for the current block based on neighboring reconstructed samples in the current picture.

When an prediction mode for a current block is an inter prediction mode, the predictors 830-1 and 830-0 may perform inter prediction for the current block based on information included in at least one of picture before or after the current picture. Some or all of motion information necessary for inter prediction may be derived by checking information received from the encoding apparatus.

When a skip mode is applied as an inter prediction mode, residual is not transmitted from the encoding apparatus and a prediction block may be a reconstructed block.

Meanwhile, the predictor 830-1 of layer 1 may perform inter prediction or intra prediction using only information on layer 1 and perform inter-layer prediction using information on another layer (layer 0).

As information on a current layer predicted using information on another layer (e.g., predicted by inter-layer prediction), there may be at least one of texture, motion information, unit information, a predetermined parameter (e.g., a filtering parameter, etc.).

As information on another layer used for prediction of the current layer (e.g., used for inter-layer prediction), there may be at least one of texture, motion information, unit information, a predetermined parameter (e.g., a filtering parameter, etc.).

In inter-layer prediction, a current block may be a block in a current picture in a current layer (e.g., layer 1) and may be a block to be decoded. A reference block may be a block in a picture (reference picture) belonging to the same access unit (AU) as a picture (current picture), to which the current block belongs, on a layer (reference layer, e.g., layer 0) referenced for prediction of the current block and may be a block correspond to the current block.

The multi-layer decoding apparatus 800 may perform inter-layer prediction as described in the multi-layer encoding apparatus 2100. For example, the multi-layer decoding apparatus 200 may perform inter-layer texture prediction, inter-layer motion prediction, inter-layer unit information prediction, inter-layer parameter prediction, inter-layer residual prediction, inter-layer difference prediction, inter-layer syntax prediction, etc., as described in the multi-layer encoding apparatus 2100 and inter-layer prediction applicable in the present disclosure is not limited thereto.

The predictor 830-1 may perform inter-layer prediction using an inter-layer reference picture, when a reference picture index received from the encoding apparatus or a reference picture index derived from a neighboring block indicates an inter-layer reference picture in a reference picture list. For example, the predictor 830-1 may derive a sample value of a region specified by a motion vector in the inter-layer reference picture as a prediction block for a current block, when a reference picture index indicates an inter-layer reference picture.

In this case, the inter-layer reference picture may be included in a reference picture list for a current block. The predictor 830-1 may perform inter prediction for the current block using the inter-layer reference picture.

As described above in the multi-layer encoding apparatus 700, in operation of the multi-layer decoding apparatus 800, the inter-layer reference picture may be a reference picture constructed by sampling a reconstructed picture of a reference layer to correspond to a current layer. Processing for the case where the reconstructed picture of the reference layer corresponds to the picture of the current layer may be performed in the same manner as the encoding process.

In addition, as described above in the multi-layer encoding apparatus 700, in operation of the multi-layer decoding apparatus 800, a reconstructed picture of a reference layer, from which an inter-layer reference picture is derived, may be a picture belonging to the same AU as a current picture to be encoded.

In addition, as described above in the multi-layer encoding apparatus 700, in operation of the multi-layer decoding apparatus 800, when inter prediction for a current block is performed by including the inter-layer reference picture in a reference picture list, the position of the inter-layer reference picture in the reference picture list may be different between reference picture lists L0 and L1.

In addition, as described above in the multi-layer encoding apparatus 700, in operation of the multi-layer decoding apparatus 800, when inter prediction for a current block is performed based on a reference picture list including an inter-layer reference picture, the reference picture list may include a plurality of inter-layer reference pictures derived from a plurality of layers, and arrangement of inter-layer reference pictures may be performed to correspond to that described in the encoding process.

In addition, as described above in the multi-layer encoding apparatus 700, in operation of the multi-layer decoding apparatus 800, as information on an inter-layer reference picture, only a sample value may be used, only motion information (motion vector) may be used or both a sample value and motion information may be used.

The multi-layer decoding apparatus 800 may receive a reference index indicating an inter-layer reference picture in a reference picture list from the multi-layer encoding apparatus 700 and perform inter-layer prediction based on the same. In addition, the multi-layer decoding apparatus 800 may receive, from the multi-layer encoding apparatus 700, information for specifying which information (sample information, motion information or sample information and motion information) is used from the inter-layer reference picture, that is, information for specifying a dependency type of dependency for inter-layer prediction between two layers.

Motion Information Derivation

The encoding apparatus and the decoding apparatus according to an embodiment may perform inter prediction using motion information of a current block. The encoding apparatus may derive optimal motion information of the current block through a motion estimation procedure. For example, the encoding apparatus may search for a similar reference block with high correlation within a predetermined search range in a reference picture in fractional pixel units by using an original block in an original picture for the current block, thereby deriving motion information.

In an embodiment, similarity of a block may be derived based on a difference between phase-based sample values. For example, the similarity of the block may be calculated based on a sum of absolute difference (SAD) between the current block (or the template of the current block) and the reference block (or the template of the reference block). In this case, motion information may be derived based on a reference block having the smallest SAD in a search area. The derived motion information may be signaled to the decoding apparatus according to various methods based on an inter prediction mode.

In an embodiment, when a merge mode is applied, motion information of a current prediction block is not directly transmitted, but motion information of the current prediction block is derived using motion information of a neighboring prediction block. Accordingly, the motion information of the current prediction block may be indicated by transmitting flag information indicating that the merge mode has been used and a merge index indicating which neighboring prediction block has been used. The merge mode may be referred to as a regular merge mode. For example, the merge mode may be applied when the value of a syntax element regular_merge_flag is 1.

In order to perform the merge mode, the encoding apparatus shall search for a merge candidate block used to derive motion information of the current prediction block. For example, up to five merge candidate blocks may be used, but the embodiment(s) of the present disclosure is not limited thereto. In addition, the maximum number of merge candidate blocks may be transmitted in a slice header or a tile group header, and embodiment(s) of the present disclosure are not limited thereto. After finding the merge candidate blocks, the encoding apparatus may generate a merge candidate list, and may select a merge candidate block having the lowest cost from among them as a final merge candidate block.

Figure 9:
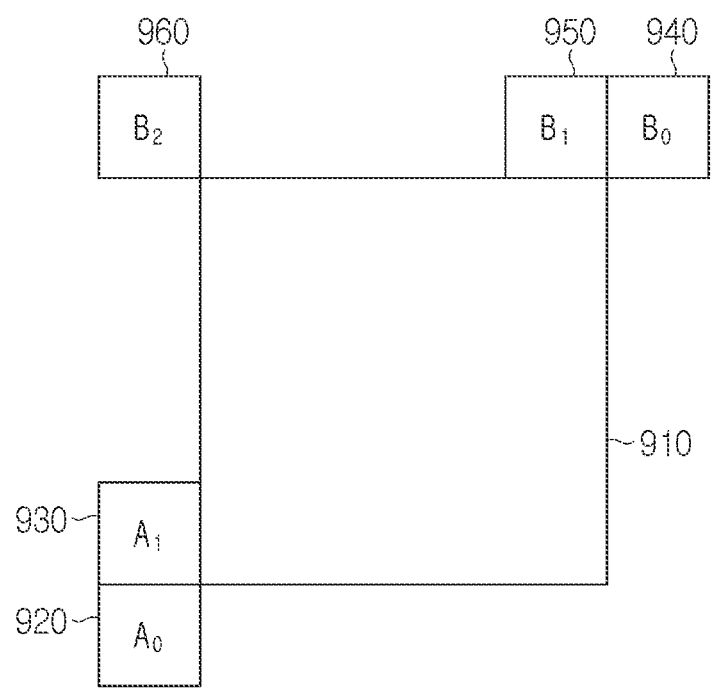

The present disclosure provides various embodiments of a merge candidate block constituting the merge candidate list. The merge candidate list may use, for example, five merge candidate blocks. For example, four spatial merge candidates and one temporal merge candidate may be used. As a specific example, in the case of a spatial merge candidate, the blocks shown in FIG. 9 may be used as spatial merge candidates. Hereinafter, a spatial merge candidate or a spatial motion vector predictor (MVP) candidate may be referred to as a spatial motion vector predictor (SMVP), and a temporal merge candidate or a temporal MVP candidate may be referred to as a temporal motion vector predictor (TMVP).

Figure 10:
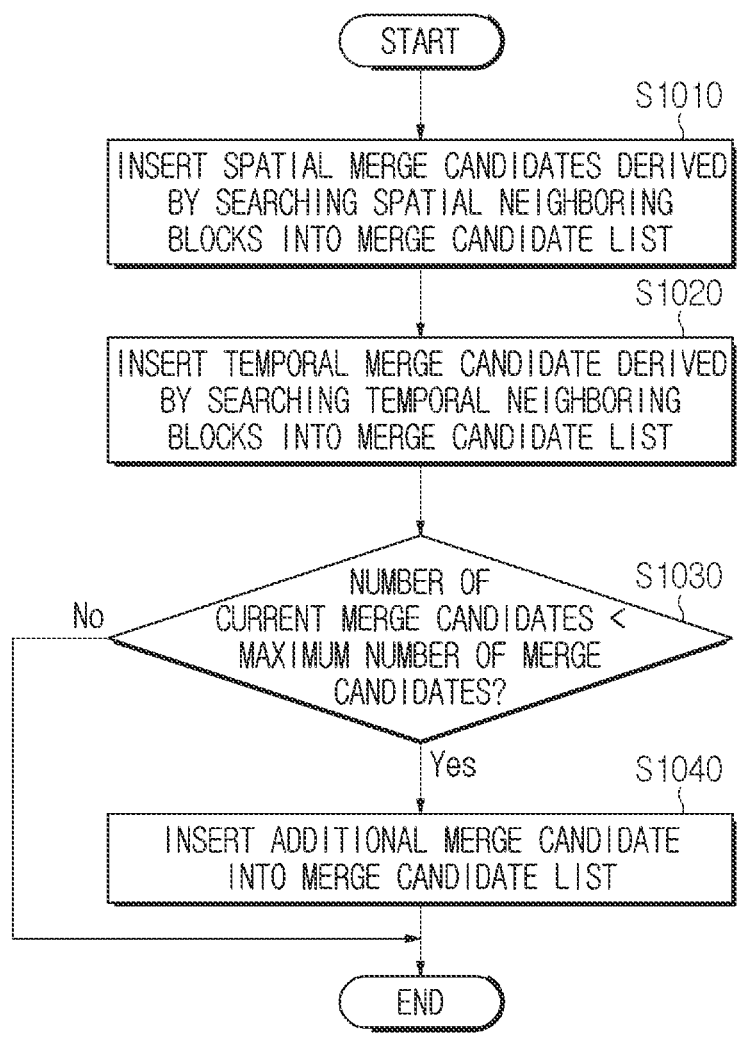

In an embodiment, the merge candidate list for the current block may be configured based on the merge candidate list construction procedure shown in FIG. 10.

The coding apparatus (encoding apparatus/decoding apparatus) may insert spatial merge candidates derived by searching spatial neighboring blocks of the current block into the merge candidate list (S1010). For example, the spatial neighboring blocks may include a bottom-left corner neighboring block 920, left neighboring block 930, top-right corner neighboring block 940, top neighboring block 950, and top-left corner neighboring block 960 of the current block 910. However, this is an example, and, in addition to the above-described spatial neighboring blocks, additional neighboring blocks such as a right neighboring block, a bottom neighboring block, and a bottom-right neighboring block may be further used as the spatial neighboring blocks.

The coding apparatus may detect available blocks by searching for the spatial neighboring blocks based on priority, and may derive motion information of the detected blocks as the spatial merge candidates. For example, the encoder and the decoder may search for five blocks shown in FIG. 9 in the order of A1, B1, B0, A0, and B2, and sequentially index the available candidates to construct the merge candidate list.

The coding apparatus may insert a temporal merge candidate derived by searching temporal neighboring blocks of the current block into the merge candidate list (S1020). The temporal neighboring block may be located on a reference picture that is a different picture than the current picture in which the current block is located. The reference picture in which the temporal neighboring block is located may be called a co-located picture or a col picture. The temporal neighboring block may be searched for in the order of a bottom-right corner neighboring block and a bottom-right center block of a co-located block for the current block on the col picture. Meanwhile, when motion data compression is applied, specific motion information may be stored in the col picture for each predetermined storage unit as representative motion information. In this case, there is no need to store motion information of all blocks in the predetermined storage unit, thereby obtaining a motion data compression effect. In this case, the predetermined storage unit may be predetermined to be, for example, a 16×16 sample unit or an 8×8 sample unit, or size information of the predetermined storage unit may be signaled from an encoder to a decoder. When the motion data compression is applied, the motion information of the temporal neighboring block may be replaced with representative motion information of the predetermined storage unit in which the temporal neighboring block is located. That is, in this case, from an implementation point of view, the temporal merge candidate may be derived based on motion information of a prediction block covering a position arithmetic-left-shifted after arithmetic right shift by a predetermined value based on the coordinate (top-left sample position) of the temporal neighboring block, not a prediction block located on the coordinates of the temporal neighboring block. For example, when the predetermined storage unit is a 2n×2n sample unit, if the coordinates of the temporal neighboring block are (xTnb, yTnb), motion information of a prediction block located at the corrected position ((xTnb»n)«n), (yTnb»n)«n)) may be used for the temporal merge candidate. Specifically, for example, when the predetermined storage unit is a 16×16 sample unit, if the coordinates of the temporal neighboring block are (xTnb, yTnb), motion information of a prediction block located at the corrected position ((xTnb»4)«4), (yTnb»4)«4)) may be used for the temporal merge candidate. Alternatively, for example, when the predetermined storage unit is an 8×8 sample unit, if the coordinates of the temporal neighboring block are (xTnb, yTnb), motion information of a prediction block located at the corrected position ((xTnb»3)«3), (yTnb»3)«3)) may be used for the temporal merge candidate.

The coding apparatus may determine whether the number of current merge candidates is less than a maximum number of merge candidates (S1030). The maximum number of merge candidates may be predefined or signaled from an encoder to a decoder. For example, the encoding apparatus may generate information on the maximum number of merge candidates, encode it, and transmit it to the decoding apparatus in the form of a bitstream. When the maximum number of merge candidates is reached, the subsequent candidate addition process may not be performed.

As a result of determination, if the number of current merge candidates is less than the maximum number of merge candidates, the coding apparatus may insert an additional merge candidate into the merge candidate list (S1040). The additional merge candidate may include at least one of a history based merge candidate(s) (HMVP), a pair-wise average merge candidate(s), ATMVP, and a combined bi-predictive merge candidate (in the case where a slice/tile group type of a current slice/tile group is a B type) and/or a zero vector merge candidate.

As a result of determination, if the number of the current merge candidates is not less than the maximum number of merge candidates, the coding apparatus may end the construction of the merge candidate list. In this case, the encoding apparatus may select an optimal merge candidate from among merge candidates constituting the merge candidate list based on rate-distortion (RD) cost, and signal selection information (e.g., merge index) indicating the selected merge candidate to the decoding apparatus. The decoding apparatus may select the optimal merge candidate based on the merge candidate list and the selection information.

As described above, the motion information of the selected merge candidate may be used as the motion information of the current block, and prediction samples of the current block may be derived based on the motion information of the current block, as described above. The encoding apparatus may derive residual samples of the current block based on the prediction samples, and may signal residual information of the residual samples to the decoding apparatus. As described above, the decoding apparatus may generate reconstructed samples based on residual samples derived based on the residual information and the prediction samples, and generate a reconstructed picture based thereon.

When a skip mode is applied, the motion information of the current block may be derived in the same way as when the merge mode is applied. However, when the skip mode is applied, the residual signal for the corresponding block is omitted, and thus prediction samples may be directly used as reconstructed samples. The skip mode may be applied, for example, when the value of cu_skip_flag is 1.

Derivation of Temporal Motion Vector Predictor (TMVP)

A method of deriving a temporal candidate will be described in more detail. Here, the temporal candidate may indicate the above-described temporal merge candidate. Also, a motion vector included in the temporal candidate may correspond to a temporal MVP candidator.

In the step of deriving the temporal candidate, only one temporal candidate may be included in the candidate list. In particular, in the derivation of the temporal merge candidate, a scaled motion vector may be derived based on a collocated CU belonging to a collocated reference picture which may be referenced by colPic. The reference picture list used to derive the collocated CU may be explicitly signaled through a slice header.

Figure 11:
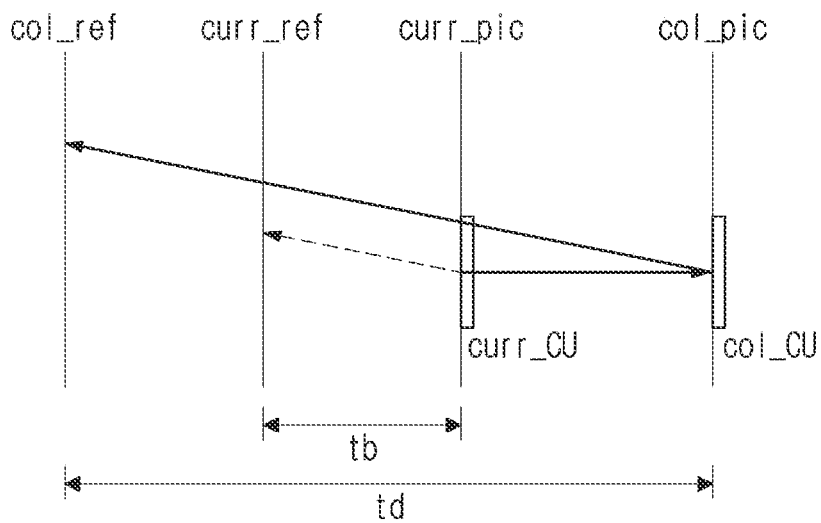

A scaled motion vector for the temporal merge candidate is represented by a dotted line in FIG. 11. The scaled motion vector may be obtained by scaling the motion vector of the collocated CU using POC differences tb and td. Here, tb may be defined as a POC difference between the reference picture of the current picture and the current picture. In addition, td may be defined as a POC difference between the reference picture of the collocated picture and the collocated picture. The reference picture index of the temporal merge candidate may be set to 0. The position of the temporal candidate may be selected as one of candidates C0 and C1 as shown in FIG. 12. If the CU at a position C0 is not available, is intra-coded, or is located outside a current CTU row, a position C1 may be used. Otherwise, the position C0 may be used to derive a temporal merge candidate.

Merge Mode with MVD (MMVD)

Merge mode with motion vector differences (MMVD) may be utilized in addition to the merge mode in which implicitly derived motion information is directly used to generate a prediction sample of a current CU. Since similar motion information derivation methods may be used for the skip mode and the merge mode, MMVD may also be applied to the skip mode. In order to indicate whether the MMVD mode is used for a corresponding CU, an MMVD flag (e.g., mmvd_flag) may be signaled immediately after signaling of a skip flag and a merge flag.

In MMVD, after the merge candidate is selected, the following processing may be performed using signaled MVD information. For example, when MMVD is applied to the current block (e.g., when the value of mmvd_flag is 1), additional information on MMVD may be signaled. Additional information may include a merge candidate flag (e.g., mmvd_cand_flag) indicating whether a first candidate (e.g., 0) or a second candidate (e.g., 1) in the merge candidate list is used for MVD, a distance index (e.g., mmvd_distance_idx) indicating a motion scale, and a direction index (e.g., mmvd_direction_idx) indicating a motion direction.

In the MMVD mode, one of two candidates appearing first among the candidates in the merge list may be selected to be used as a base value of the motion vector. mmvd_cand_flag may be signaled to indicate which one of them is used.

mmvd_distance_idx specifies motion scale information, and may indicate a predefined offset from a starting point. As shown in FIG. 13, an offset may be added to a horizontal component or a vertical component of a starting motion vector.

In an embodiment, a relationship between mmvd_distance_idx and a predefined offset may be defined as shown in the table of FIG. 14. Here, a value 1 of slice_fpel_mmvd_enabled_flag may indicate that MMVD in the current slice uses integer sample precision, and a value 0 may indicate that it uses fractional sample precision.

mmvd_direction_idx may indicate the direction of the MVD in relation to the starting point. mmvd_direction_idx may indicate four directions as shown in FIG. 15. What the sign of the MVD indicates may vary according to information on the starting motion vector.

When the starting motion vector is an unpredicted motion vector, or when two lists are both prediction motion vectors indicating the same side of the current picture (e.g., when POCs of two pictures are both larger or smaller than the POC of the current picture), the sign in the table of FIG. 15 may be the sign of the MV offset added to the starting motion vector. When the starting motion vector is a bi-prediction motion vector having two motion vectors representing different sides of the current picture (the POC of one reference picture is larger than that of the current picture, and the POC of the other reference picture is that of the current picture), a sign in the table of FIG. 15 may indicate a sign of an MV offset added to the list 0 MV component of the starting MV and a sign having an opposite value for the list 1 MV.

In an embodiment, the MVD offset MmvdOffset[x0][y0] added to the merge MV may be derived as shown in the following equation.

$$MmvdOffset[x0][y0][0]=(MmvdDistance[x0][y0]\ll 2)$$
$$*MmvdSign[x0][y0][0]$$

$$MmvdOffset[x0][y0][1]=(MmvdDistance[x0][y0]\ll 2)$$
$$*MmvdSign[x0][y0][1] \quad \text{[Equation 1]}$$

TMVP Prediction Problem in Inter-Layer Reference Picture

Hereinafter, a method of performing TMVP and MMVD in an embodiment in which inter-layer prediction is performed will be described. In the following embodiments, a temporal candidate includes not only TMVP for the merge mode described above, but also inter mode (MVP) and TMVP in subblock-based motion vector prediction, and may be determined in consideration of the characteristics of inter-layer prediction in the derivation process of a collocated picture and colMV. Then, a method of deriving the offset of MMVD in consideration of the characteristics of inter-layer prediction will be described.

In the present disclosure, a temporal motion information candidate (e,g., a temporal candidate, a temporal merge candidate, a temporal mvp candidate, etc.) may be referred to as a temporal motion vector predictor (MVP). The TMVP may be referred to as collocated MV (colMV).

As an example, the TMVP may be derived from the col block (colCb) of the reference picture (e.g., collocated picture, Colpic) having a POC different from the POC of the current picture in the same layer. As another example, when inter-layer prediction is applied, the TMVP may be derived from a col block in an inter-layer reference picture. In this case, the inter-layer reference picture may be located on a different layer (reference layer) other than a current layer in which the current block is located. The inter-layer reference picture may have the same POC as the POC of the current picture.

In the present disclosure, TMVP/colMV used in inter-layer prediction may include an inter-layer (motion information) candidate. For example, the TMVP/colMV may be derived from an inter-layer reference picture, and may be included as a candidate in the motion information candidate list regarding the above-described merge, MMVD, MVP, subblock merge, and the like. For example, when inter-layer prediction is applied, the inter-layer candidate may be additionally inserted into the motion information candidate list, or, as another example, the inter-layer candidate may be included in the motion information candidate list, instead of the TMVP derived from the reference picture having a POC different from the POC of the current picture in the same layer.

FIG. 16 illustrates a part of colMV derivation process of TMVP. FIG. 16 illustrates an algorithm for determining whether derivation of colMV is available using a LongTermRefPic( ) function.

In the example of FIG. 16, if the picture with index refIdx from reference picture list LX of the slice containing prediction block aPb in the picture aPic was marked as "used for long-term reference" at the time when aPic was the current picture, LongTermRefPic(aPic, aPb, refIdx, LX) returns 1 as a value and, otherwise, returns 0 (1610).

Here, currPic may indicate a current picture, currCb may indicate a current coding block, refIdxLX may indicate a reference index for a reference picture list LX, and LX may indicate a reference picture list. In addition, ColPic may indicate a collocated picture, colCb may indicate a col block, refIdxCol may indicate a reference index for a reference picture list listCol for a collocated block, and listCol may indicate a reference picture list for a collocated block. For example, LongTermRefPic(currPic, currCb, refIdxLX, LX) returns 1 when the type of the reference picture indicated by the reference index refIdxLX of the current block currCb present in the current picture currPic is a long-term reference picture (LTRP) and returns 0 when it is a short-term reference picture (STRP).

In the example of FIG. 16, if LongTermRefPic(currPic, currCb, refIdxLX, LX) is not equal to LongTermRefPic (ColPic, colCb, refIdxCol, listCol), the value of colMV (mvLXCol) is set to 0. Then, the value of availableflagLXCol is set to 0 (1620). Here, mvLXCol may represent an LX (X being 0 or 1) collocated motion vector. In addition, availableFlagLXCol may be a flag indicating whether the LX (X being 0 or 1) collocated motion vector is available.

On the other hand, if LongTermRefPic(currPic, currCb, refIdxLX, LX) is equal to LongTermRefPic(ColPic, colCb, refIdxCol, listCol), the value of mvLXCol is derived according to the following steps. For example, when the reference picture type of the current picture and the reference picture type of the collocated picture are both LTRPs, the derived colMV is used without scaling (1630). When the reference picture type of the current picture and the reference picture type of the collocated picture are both STRPs, colMV is derived by scaling based on the distance from the reference picture (1640).

Meanwhile, in the embodiment of FIG. 16, when inter-layer prediction is applied to the current picture, a picture having the same POC of a lower layer may be derived as a collocated picture. In addition, in the example of FIG. 16, since TMVP is applicable when the reference picture type is the same, the reference picture types of the reference picture RefPic of the current picture and the reference picture colRefPic of the collocated picture are both STRPs as shown in (A) of FIG. 17 or both LTRPs as shown in (B) of FIG. 17, TMVP may be derived.

Figure 18:
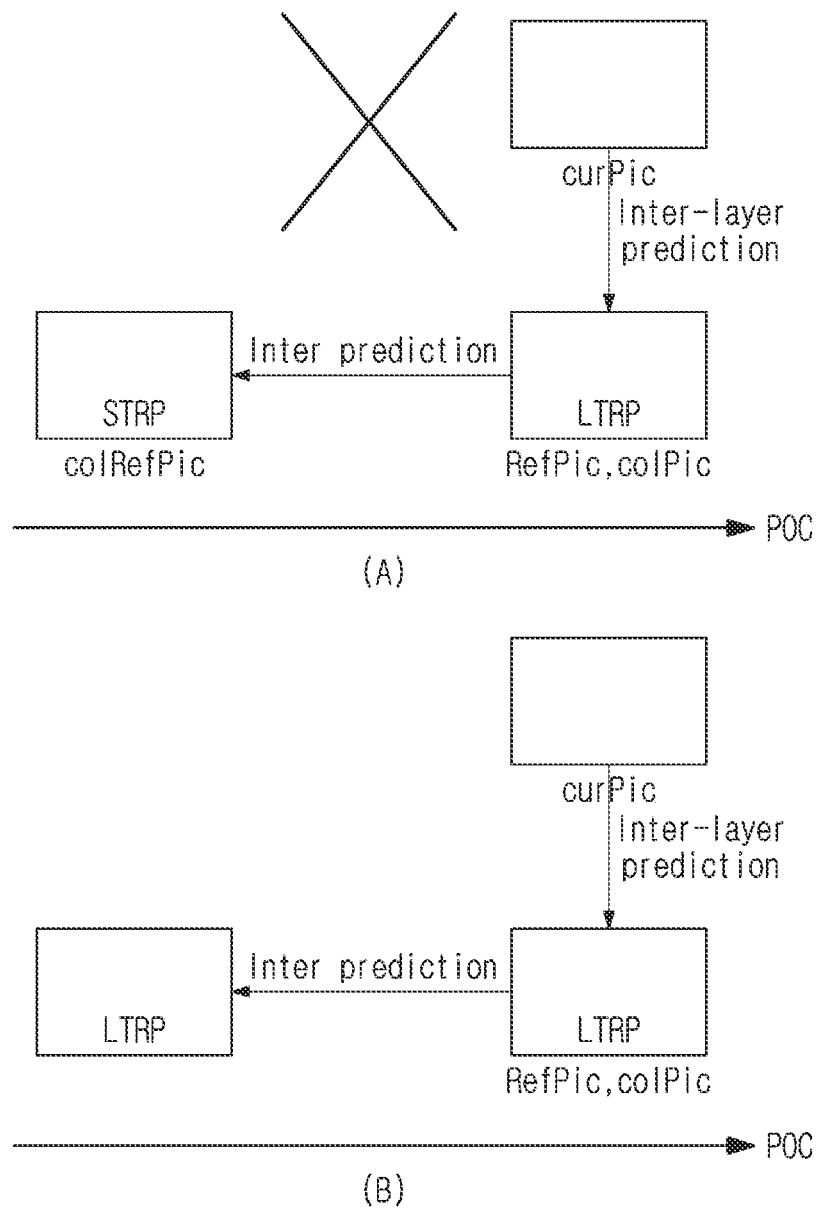

Meanwhile, in an embodiment, when inter-layer prediction is applied, the inter-layer reference picture may be marked with an LTRP to distinguish it from the current layer even if it is not an actual LTRP. For example, a picture present on a layer different from the current picture may always be marked with an LTRP. In this case, if RefPic is equal to colPic as shown in FIG. 19, RefPic (=colPic) is always marked with an LTRP in that the reference picture present on other layer are always marked with an LTRP. At this time, as shown in (A) of FIG. IS, when colRefPic is an STRP, reference picture types between RefPic and colRefPic are determined differently. Accordingly, in the example of (A) of FIG. 18, TMVP cannot be applied. However, when colRefPic is an LTRP as shown in (B) of FIG. 18, TMVP is applicable.

Similarly, when a picture present on a layer different from the current picture is always marked with an LTRP, TMVP is not always derived when RefPic is marked with an STRP as shown in FIG. 19 to (A) of FIG. 21, and TMVP is always derived when RefPic is marked with an LTRP as shown in FIG. 19 to (B) of FIG. 21. As described above, as a picture present on a different layer from the current picture is always marked with an LTRP, TMVP is derived only by the value of RefPic regardless of whether the reference picture types of RefPic and colPic are the same.

Embodiment 1

In order to solve such a problem, in an embodiment, even when the layers of the current picture currPic and the reference picture RefPic are different or the layers of the collocated picture colPic and the reference picture colRefPic of the collocated picture are different, it is possible to perform such processing so that TMVP is not applied. For this processing, as shown in FIG. 22, the layers of the current picture currPic and the reference picture RefPic are the same, and the layers of the collocated picture colPic and the reference picture colRefPic of the collocated picture may be restricted to be the same (2210). In this case, whether the layers of both pictures are the same may be determined by referencing nuh_layer_id which is a layer identifier identified in the header of a network abstraction layer (NAL) unit or vps_layer_id which is a layer ID identified in VPS.

Alternatively, in another embodiment, when comparing the reference picture type of the reference picture RefPic of the current picture with the reference picture colRefPic of the collocated picture, if the layers of the current picture currPic and its reference picture RefPic or the layers of the collocated picture colPic and its reference picture colRefPic are different, it may be changed such that TMVP is not applied. For this purpose, as shown in FIG. 23, the definition of the LongTermRefPic( ) function may be changed.

In the function definition in FIG. 16, LongTermRefPic( ) returns a value of 1 or 0 based on whether or not LTRP is marked without considering the layer, but, in the LongTermRefPic( ) function definition of FIG. 23, LongTermRefPic( ) was modified to determine whether the reference picture and the current picture belong to the same layer. LongTermRefPic( ) of FIG. 23 determines whether the layers of the reference picture and the current picture are the same, returns a value of 2 when they are different, a value of 1 when the layers are the same and it is an LTRP, and a value of 0 when the layers are the same and it is an STRP (2310).

As described above, by using the changed function definition, TMVP may not be applied because LongTermRefPic( ) returns a value of 2 for the reference picture for inter-layer prediction. To this end, as shown in FIG. 23, in order to restrict TMVP when both refPic and colRefPic are returned to 2 along with a change in the definition of LongTermRefPic( ), whether the values of LongTermRefPic (currPic, currCb, refIdxLX, LX) for refPic and LongTermRefPic(ColPic, colCb, refIdxCol, listCol) for colRefPic are both 2 may be checked, and, in such a case, the application of TMVP is restricted, and the values of mvLXCol and availableFlagLXCol may be determined to be 0 (2320).

Embodiment 2

Meanwhile, in an embodiment, when inter-layer prediction and inter prediction are used interchangeably, TMVP may be restricted. To this end, as shown in FIG. 24, in the process of encoding and decoding an image, both the reference picture RefPic of the current picture and the reference picture colRefPic of the collocated picture may be restricted to be both inter-layer reference pictures or pictures other than inter-layer reference picture (2410).

For example, as shown in FIG. 25, in the process of encoding and decoding an image, it may be restricted such that the current picture currPic has the layer identifier (e.g., nuh_layer_id) equal to the reference picture of the current picture, and the collocated picture colPic has the layer identifier (e.g., nuh_layer_id) equal to the reference picture colRefPic of the collocated picture. Alternatively, it may be restricted such that the current picture currPic has a layer identifier (e.g., nuh_layer_id) that is not equal to the reference picture of the current picture, and the collocated picture colPic has a layer identifier (e.g., nuh_layer_id) that is not equal to the reference picture colRefPic of the collocated picture. However, it may be restricted such that only one of the reference picture RefPic of the current picture and the reference picture colRefPic of the collocated picture is not an inter-layer reference picture (2510).

Alternatively, in another embodiment, as shown in FIG. 26, the definition of the LongTermRefPic( ) function may be changed. For example, LongTermRefPic( ) may return a value by determining whether the reference picture is on the same layer as the current picture. For example, the function definition of LongTermRefPic( ) may be changed, such that a value of 2 is returned when the layers of the reference picture and the current picture are different from each other, a value of 1 is returned when the layers of the reference picture and the current picture are the same and it is an LTRP, and a value of 0 is returned when the layers of the reference picture and the current picture are the same and it is an STRP (2610). As shown in FIG. 26, since a value of 2 is returned for a reference picture for inter-layer prediction by changing the function definition of LongTermRefPic( ), TMVP may be determined by further considering a case in which inter-layer prediction is performed.

Embodiment 3

Figure 27:
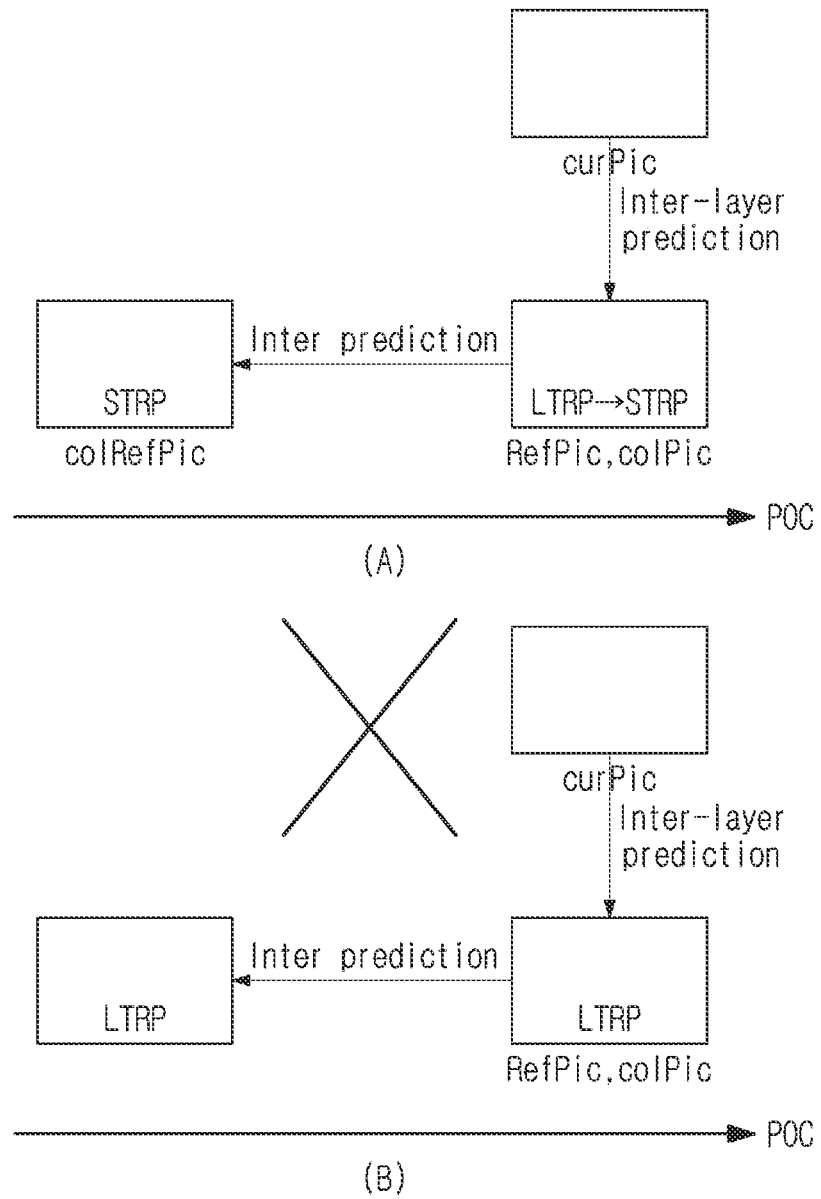
Figure 29:
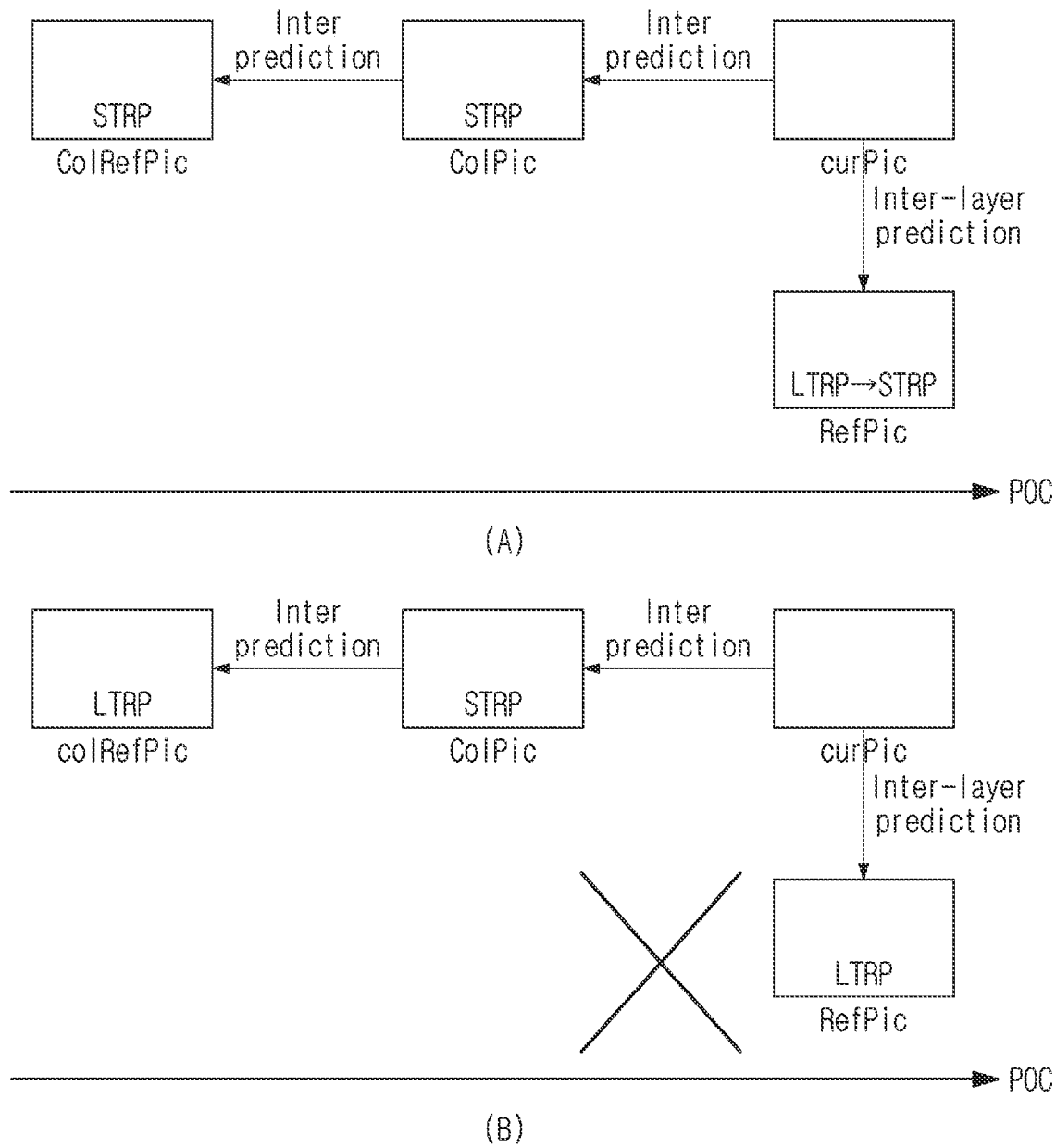

On the other hand, in another embodiment, when inter-layer prediction is applied in the TMVP process, by treating the inter-layer reference picture as an STRP, when the reference picture RefPic of the current picture and the reference picture colRefPic of the collocated picture are STRPs, TMVP may be applied. Accordingly, unlike the case of FIGS. 18 to 20, when the reference picture type of RefPic is an STRP as shown in FIG. 27 to (A) of FIG. 29, TMVP may be derived.

For such processing, the definition of the LongTermRefPic( ) function may be changed as shown in FIG. 30. For example, the definition of the LongTermRefPic( ) function may be changed to return 1 as a value only when the reference picture is present on the same layer as a target picture and the type of the reference picture is LTRP (3010). Accordingly, when the reference picture is present in a layer different from the target picture or the type of the reference picture is not LTRP, 0 may be returned as a value.

In the embodiment of FIG. 30, if the reference picture type of the reference picture of the current picture and the reference picture type of the reference picture of the collocated picture are not the same, as described above, the values of mvLXCol and availableFlagLXCol may be derived to be 0 (3020).

On the other hand, if the reference picture type of the reference picture of the current picture and the reference picture type of the reference picture of the collocated picture are the same, the values of mvLXCol and availableFlagLXCol may be derived as shown in FIG. 30. For example, when the reference picture of the current picture is an LTRP, the value of colPocDiff is 0, or colPocDiff is equal to currPocDiff, the value of mvLXCol may be determined without applying scaling (3030). However, if not, the value of mvLXCol may be determined by applying scaling (3040).

Here, colPocDiff may represent a difference between the POC of the collocated picture and the POC of the reference picture of the collocated block. In addition, currPocDiff may indicate a difference between the POC of the current picture and the POC of the reference picture of the current block.

By changing this way, by determining the return value of the LongTermRefPic( ) function to be 0 for the reference picture for inter-layer prediction, the reference picture type of the reference picture for inter-layer prediction is the same reference picture type as ColRefPic, which is an STRP. In this way, changing the definition of the return value of the LongTermRefPic( ) function to treat the return value of the LongTermRefPic( ) function for the inter-layer reference picture the same as that of STRP is modifying the return value of the LongTermRefPic( ) function for the inter-layer reference picture, and the inter-layer reference picture may still be marked with a long-term reference picture in the encoding and decoding process.

Embodiment 4

Meanwhile, in another embodiment, when inter-layer prediction is applied in the TMVP process, it may be processed so that TMVP is always applied.

In an embodiment, by changing the definition of the LongTermRefPic( ) function as shown in FIG. 31, a result value of the LongTermRefPic( ) function may be returned as a value of 2 newly defined for a reference picture for inter-layer prediction. Also, when the return values of the LongTermRefPic( ) function for RefPic and colRefPic are different and the return value of the LongTermRefPic( ) function for any one of RefPic and colRefPic is not 2, it may be processed so that colMV is not derived. In addition, when the return values of the LongTermRefPic( ) function for RefPic and colRefPic are the same or the return value of the LongTermRefPic( ) function for both RefPic and colRefPic is 2, it may be processed so that colMV may be derived.

For example, as in FIG. 31, when nuh_layer_id of the reference picture of the target picture is not equal to nuh_layer_id of the target picture, LongTermRefPic( ) may return 2 as a value. Otherwise, if the reference picture of the target picture is an LTRP, LongTermRefPic( ) may return 1 as a value. Otherwise, LongTermRefPic( ) may return 0 as a value. For example, if the reference picture of the target picture is an STRP and belongs to the same layer as the target picture, LongTermRefPic( ) may return 0 as a value (3110).

On the other hand, in the example of FIG. 31, when the reference picture of the current picture and the reference picture of the collocated picture do not have the same reference picture type, and at least one of the reference picture of the current picture or the reference picture of the collocated picture is not an inter-layer reference picture, the values of mvLXCol and availableFlagLXCol may be derived to be 0 (3120). Otherwise, the value of mvLXCol may be derived according to the following procedure. For example, when at least one of the reference picture of the current picture or the reference picture of the collocated picture is an inter-layer reference picture, the value of mvLXCol may be derived as illustrated in FIG. 31.

Meanwhile, in another embodiment, processing may be performed as in FIG. 32. LongTermRefPic( ) may return 1 or 0 as a value with respect to whether the reference picture is an LTRP as illustrated in FIG. 16. However, in the process of deriving colMV, colMV may be derived based on whether nuh_layer_id of the current picture and the collocated picture is equal to nuh_layer_id of its reference picture (3210).

For example, if the reference pictures of the current picture and the collocated picture have different reference picture types and nuh_layer_id of the current picture and the collocated picture is equal to nuh_layer_id of the reference picture, the values of mvLXCol and availableFlagLXCol may be set to 0.

On the other hand, if not, the values of mvLXCol and availableFlagLXCol may be derived. For example, if the reference picture of the current picture is an LTRP, the value of colPocDiff is 0, or colPocDiff is equal to currPocDiff, mvLXCol may be derived without applying scaling (3220). Otherwise, if the reference picture of the current picture is not an LTRP, the value of colPocDiff is not 0, and colPocDiff is not equal to currPocDiff, mvLXCol may be derived by applying scaling.

Embodiment 5

Inter-layer prediction may also be applied to MMVD. FIGS. 33 and 34 show a continuous algorithm, and show an MMVD offset derivation process. The items described in FIG. 34 following the items described in FIG. 33 show an MMVD offset derivation process.

Based on a POC difference currPOCDiffL0 between L0 reference picture RefPicList[0][refIdxL0] and a current picture currPic and a POC difference currPOCDiffL1 between L1 reference picture RefPicList[1][refIdxL1] and the current picture currPic, if the POC differences are the same (currPOCDiffL0==currPOCDiffL1), the derived MmvdOffset is assigned to the MVDs of L0 and L1 (3310), and, when the POC differences are different, the derived MmvdOffset (3320, 3350) is assigned in a direction where the difference is large and a scaled MmvdOffset (3330, 3360) or an inverted (mirrored) MmvdOffset (3340, 3370) is assigned to a side where the difference is small.

However, as shown in FIG. 35, when the L0 or L1 reference picture is an ILRP, a POC difference between the corresponding picture and the current picture is always 0 and the corresponding picture is treated as LTRP and thus has an MVD of −MmvdOffset.

That is, as shown in the table below, when L0 is an inter prediction reference picture and L1 is an inter-layer prediction reference picture, MmvdOffset may have the following relationship.

TABLE 1

| L0: STRP (inter prediction) | L1: LTRP(ILRP) (inter-layer prediction) |
|---|---|
| MmvdOffset | −MmvdOffset |

In addition, as shown in the table below, when L0 is an inter-layer prediction reference picture and L1 is an inter prediction reference picture, MmvdOffset may have the following relationship.

TABLE 2

| L0: LTRP(ILRP) (inter-layer prediction) | L1: STRP (inter prediction) |
|---|---|
| −MmvdOffset | MmvdOffset |

Since an ILRP does not have a symmetrical feature from the viewpoint of inter-predicted reference picture and POC, having −MmvdOffset is meaningless. Therefore, when ILRP is applied, it may be adjusted to have +MmvdOffset. In an embodiment, in order to adjust to have +MmvdOffset, the decoding process may be changed as shown in FIGS. 36 to 37. FIGS. 36 to 37 show a continuous algorithm. The Sign(target) function returns 1 when the target value is positive, 0 when the target value is 0, and −1 when the target value is negative. Accordingly, when the value of currPocDiffL0 or currPocDiffL1 is 0 (e.g., when inter-layer prediction is performed), MmvdOffset of a + sign may be assigned to mMvdL0 and mMvdL1 (3610, 3620), instead of that of − sign.

In another embodiment, in order to adjust to have +MmvdOffset, the decoding process may be changed as shown in FIG. 38. For example, if the POC difference of L0 or L1 is 0 (e.g., when inter-layer prediction is performed), both mmvd offsets for L0 and L1 may be assigned as derived values without changing signs or applying scaling (3810). Here, whether the POC difference of L0 or L1 is 0 may be determined by whether the values of Sign(currPocDiffL0) and Sign(currPocDiffL1) are 0.

Embodiment 6

On the other hand, when an ILRP is applied, +MmvdOffset or −MmvdOffset may be set to be derived in the MMVD offset derivation process. FIGS. 39 to 40 show a continuous algorithm, and the decoding process for deriving +MmvdOffset to mMvdL0 (3910) when L0 is an ILRP and deriving −MmvdOffset to mMvdL0 (3920) when L0 is not an ILRP is described.

That is, according to the decoding process of FIGS. 39 to 40, as shown in the table below, when L0 is an inter prediction reference picture and L1 is an inter-layer prediction reference picture, MmvdOffset may have the following relationship.

TABLE 3

| L0: STRP (inter prediction) | L1: LTRP(ILRP) (inter-layer prediction) |
|---|---|
| MmvdOffset | −MmvdOffset |

In addition, as shown in the table below, when L0 is an inter-layer prediction reference picture and L1 is an inter prediction reference picture, MmvdOffset may have the following relationship.

TABLE 4

| L0: LTRP(ILRP) (inter-layer prediction) | L1: STRP (inter prediction) |
|---|---|
| MmvdOffset | −MmvdOffset |

Embodiment 7

In addition, when an ILRP is applied, MmvdOffset may be set not to be applied in the MMVD offset derivation process. FIGS. 41 to 42 show a continuous algorithm, and a decoding process for setting values of mMvdL0 and mMvdL1 to 0 (4120, 4110) when L0 or L1 is an ILRP is described.

That is, according to the decoding process of FIGS. 41 to 42, as shown in the table below, since 0 may be assigned when L0/L1 is an ILRP, an offset value may be applied only to the reference picture corresponding to the symmetric characteristic of MMVD.

TABLE 5

| L0: STRP (inter prediction) | L1: LTRP(ILRP) (inter-layer prediction) |
|---|---|
| MmvdOffset | 0 |

TABLE 6

| L0: LTRP(ILRP) (inter-layer prediction) | L1: STRP (inter prediction) |
|---|---|
| 0 | MmvdOffset |

Encoding and Decoding Method

Figure 43:
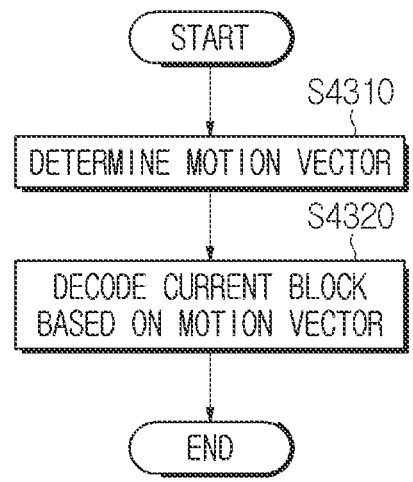
FIGS. 43 to 44 are views illustrating a decoding method and an encoding method according to an embodiment.

Hereinafter, an image encoding method and decoding method performed by an image encoding apparatus and an image decoding apparatus according to an embodiment will be described. FIG. 43 is a flowchart illustrating a method of determining a motion vector based on whether inter-layer prediction is performed in order for an image encoding apparatus according to an embodiment to encode an image and/or for an image decoding apparatus to decode an image.

An image decoding apparatus according to an embodiment includes a memory and a processor, and the decoding apparatus may perform decoding according to an embodiment described below by operation of the processor. An image encoding apparatus according to an embodiment includes a memory and a processor, and the encoding apparatus may perform encoding in a manner corresponding to the decoding of the decoding apparatus according to the embodiment described below by operation of the processor. The operation of the decoding apparatus will be described below for convenience of description, but the following description may also be applied to the encoding apparatus.

The decoding method according to an embodiment may include determining a motion vector (S4310) and decoding a current block based on the motion vector (S4320). Here, the motion vector may be determined based on at least one of a first reference picture type of a first reference picture corresponding to the current block or a second reference picture type of a second reference picture corresponding to an inter-layer corresponding block.

Here, when TMVP is applied to decoding, like the method of performing decoding in Embodiment 1 described above, the current picture and the collocated picture may be restricted to reference only pictures on a layer to which the corresponding picture belongs, respectively. For example, the first reference picture may be restricted to belong to the same layer as the current picture to which the current block belongs, and the second reference picture may be restricted to belong to the same layer as the collocated picture to which the inter-layer corresponding block belongs.

Also, like the method of performing decoding in Embodiment 1 described above, when the current picture or the collocated picture refers to a picture belonging to another layer, TMVP may be restricted not to be applied. For example, a longTermRefPic( ) function may return an independent result value for the inter-layer prediction type.

Specifically, the motion vector is determined based on a temporal motion candidate, and the reference picture type may indicate any one of a short-term reference picture type, a long-term reference picture type, and an inter-layer reference picture type, and, based on at least one of the first reference picture type or the second reference picture type being an inter-layer picture reference picture type, the temporal motion candidate may be set to a value indicating that the temporal motion candidate is not used. For example, the values of mvLXCol and availableFlagLXCol may be set to 0.

In addition, as in the method of performing decoding in Embodiment 2 described above, it may be restricted such that TMVP is applied only when both the current picture and the collocated picture are ILRPs or not ILRPs and TMVP is not applied when only any one of the current picture and the collocated picture is an ILRP.

For example, the first reference picture may be restricted to belong to a different layer than the current picture, and the second reference picture may be restricted to belong to a different layer than the picture to which the inter-layer corresponding block belongs.

Alternatively, the longTermRefPic( ) function may be changed to return a value indicating any one of a short-term reference picture type, a long-term reference picture type, and an inter-layer reference picture type, and, based on the first reference picture type and the second reference picture type having different longTermRefPic( ) return values, the temporal motion candidate may be set to a value indicating that the temporal motion candidate is not used. For example, the values of mvLXCol and availableFlagLXCol may be set to 0.

Also, as in the method of performing decoding in Embodiment 3 described above, when the reference picture of the collocated picture is an ILRP, the longTermRefPic( ) function may be modified so that the longTermRefPic( ) function returns a value corresponding to an STRP. For example, the motion vector is determined based on a temporal motion candidate, the temporal motion vector may be determined based on whether the second reference picture type is a reference picture type that refers to a long-term reference picture of the same layer, the temporal motion candidate is derived based on neither the first reference picture type nor the second reference picture type being a reference picture type that refers to a long-term reference picture of the same layer. Based on the inter-layer corresponding block and the second reference picture belonging to the same layer, the temporal motion candidate is derived by applying scaling, and, based on the inter-layer corresponding block and the second reference picture belonging to different layers, the temporal motion candidate may be derived without applying scaling.

Also, like the method of performing decoding in Embodiment 4 described above, when only one of the current picture or the collocated picture refers to a picture belonging to a different layer, the application of TMVP may be restricted. For example, the motion vector is determined based on a temporal motion candidate, and the reference picture type indicates any one of a short-term reference picture type, a long-term reference picture type, and an inter-layer reference picture type, and, based on the first reference picture type and the second reference picture type having different values and neither the first reference picture type nor the second reference picture type being an inter-layer picture reference picture, the temporal motion candidate may be set to a value indicating that the temporal motion candidate is not used.

Also, like the application of MMVD in Embodiments 5 to 7 described above, the motion vector is determined based on a motion vector offset, and the motion vector offset may be determined based on whether the first reference picture type is an inter-layer reference picture type. For example, whether the first reference picture type is an inter-layer reference picture type may be identified based on a picture order count (POC) difference between a current picture to which the current block belongs and the first reference picture being 0.

Here, as in Embodiments 5 to 6 described above, based on the POC difference between the current picture to which the current block belongs and the first reference picture being 0, the value of the motion vector offset for the first reference picture may be determined to be a positive value. Alternatively, as in Embodiment 7 described above, the value of the motion vector offset for the first reference picture may be determined to be 0 based on the POC difference between the current picture to which the current block belongs and the first reference picture being 0.

Figure 44:
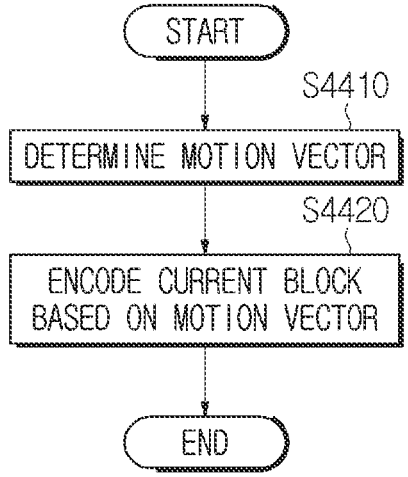

FIG. 44 is a view illustrating a method of performing encoding by an operation of a processor by an encoding apparatus including a processor and a memory according to an embodiment. In an embodiment, the image encoding method may include determining a motion vector (S4410) and encoding a current block based on the motion vector (S4420). Here, the motion vector may be determined based on at least one of a first reference picture type of a first reference picture corresponding to the current block or a second reference picture type of a second reference picture corresponding to an inter-layer corresponding block, as described in the decoding method.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 45:
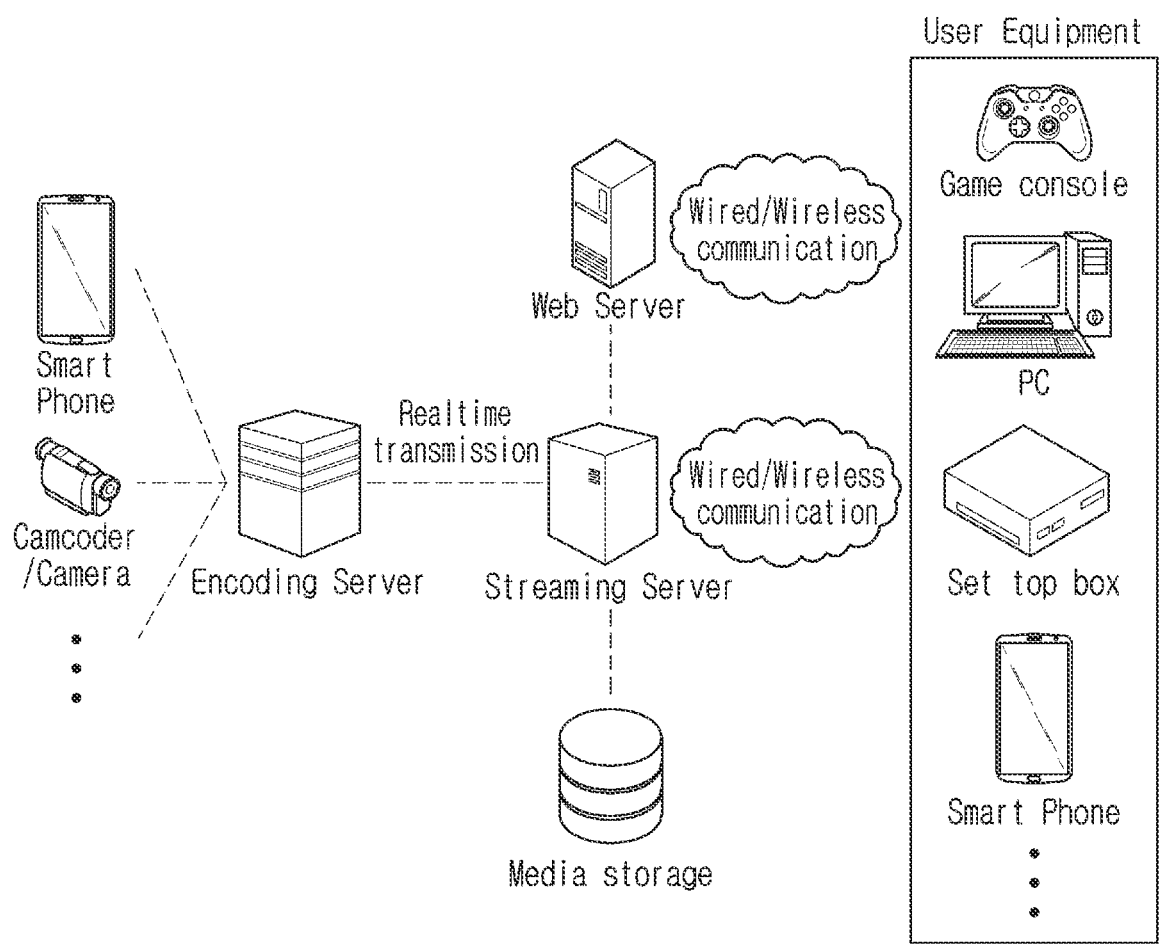
FIG. 45 is a view showing a content streaming system, to which an embodiment of the present disclosure is applicable.

FIG. 45 is a view showing a content streaming system, to which an embodiment of the present disclosure is applicable.

As shown in FIG. 45, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

What is claimed is:

1. An image decoding method performed by an image decoding apparatus, the image decoding method comprising:
determining a motion vector; and
decoding a current block based on the motion vector,
wherein the motion vector is determined based on at least one of a first reference picture type of a first reference picture corresponding to the current block or a second reference picture type of a second reference picture corresponding to an inter-layer corresponding block, and
wherein based on the motion vector being determined based on a motion vector offset, the motion vector offset is determined based on whether the first reference picture type is an inter-layer reference picture type and based on a picture order count (POC) difference between the current picture to which the current block belongs and the first reference picture being 0, a value of a motion vector offset for the first reference picture is determined to be positive value or 0.

2. The image decoding method of claim 1,
wherein the first reference picture is restricted to belong to the same layer as a current picture to which the current block belongs, and
wherein the second reference picture is restricted to belong to the same layer as a picture to which the inter-layer corresponding block belongs.

3. The image decoding method of claim 1,
wherein the motion vector is determined based on a temporal motion candidate,
wherein a reference picture type indicates any one of a short-term reference picture type, a long-term reference picture type and an inter-layer reference picture type, and
wherein, based on at least one of the first reference picture type or the second reference picture type being an inter-layer picture reference picture type, the temporal motion candidate is set to a value indicating that a temporal motion candidate is not used.

4. The image decoding method of claim 1,
wherein the first reference picture is restricted to belong to a different layer than a current picture to which the current block belongs, and
wherein the second reference picture is restricted to belong to a different layer than a picture to which the inter-layer corresponding block belongs.

5. The image decoding method of claim 1,
wherein the motion vector is determined based on a temporal motion candidate,
wherein a reference picture type indicates any one of a short-term reference picture type, a long-term reference picture type and an inter-layer reference picture type, and
wherein, based on the first reference picture type and the second reference picture type having different values, the temporal motion candidate is set to a value indicating that a temporal motion candidate is not used.

6. The image decoding method of claim 1,
wherein the motion vector is determined based on a temporal motion candidate, and
wherein the temporal motion candidate is determined based on whether the second reference picture type is a reference picture type referencing a long-term reference picture of the same layer.

7. The image decoding method of claim 6,
wherein the motion vector is determined based on a temporal motion candidate,
wherein, based on neither the first reference picture type nor the second reference picture type being a reference picture type referencing a long-term reference picture of the same layer, the temporal motion candidate is derived, and
wherein, based on the inter-layer corresponding block and the second reference picture belonging to the same layer, the temporal motion candidate is derived by applying scaling.

8. The image decoding method of claim 1,
wherein the motion vector is determined based on a temporal motion candidate,
wherein a reference picture type indicates any one of a short-term reference picture type, a long-term reference picture type and an inter-layer reference picture type, and
wherein, based on the first reference picture type and the second reference picture type having different values and neither the first reference picture type nor the second reference picture type being an inter-layer picture reference picture, the temporal motion candidate is set to a value indicating that a temporal motion candidate is not used.

9. The image decoding method of claim 1, wherein whether the first reference picture type is an inter-layer reference picture type is identified based on the POC difference between a current picture to which the current block belongs and the first reference picture being 0.

10. An image decoding apparatus comprising a memory and at least one processor, wherein the at least one processor is configured to:
determine a motion vector; and
decode a current block based on the motion vector,
wherein the motion vector is determined based on at least one of a first reference picture type of a first reference picture corresponding to the current block or a second reference picture type of a second reference picture corresponding to an inter-layer corresponding block, and
wherein based on the motion vector being determined based on a motion vector offset, the motion vector offset is determined based on whether the first reference picture type is an inter-layer reference picture type and based on a picture order count (POC) difference between the current picture to which the current block belongs and the first reference picture being 0, a value of a motion vector offset for the first reference picture is determined to be positive value or 0.

11. An image encoding method performed by an image encoding apparatus, the image encoding method comprising:
determining a motion vector; and
encoding a current block based on the motion vector,
wherein the motion vector is determined based on at least one of a first reference picture type of a first reference picture corresponding to the current block or a second reference picture type of a second reference picture corresponding to an inter-layer corresponding block, and
wherein based on the motion vector being determined based on a motion vector offset, the motion vector offset is determined based on whether the first reference picture type is an inter-layer reference picture type and based on a picture order count (POC) difference between the current picture to which the current block belongs and the first reference picture being 0, a value of a motion vector offset for the first reference picture is determined to be positive value or 0.

12. A method for transmitting a bitstream generated by operations comprising:
determining a motion vector; and
encoding a current block based on the motion vector,
wherein the motion vector is determined based on at least one of a first reference picture type of a first reference picture corresponding to the current block or a second reference picture type of a second reference picture corresponding to an inter-layer corresponding block, and wherein based on the motion vector being determined based on a motion vector offset, the motion vector offset is determined based on whether the first reference picture type is an inter-layer reference picture type and based on a picture order count (POC) difference between the current picture to which the current block belongs and the first reference picture being 0, a value of a motion vector offset for the first reference picture is determined to be positive value or 0.

* * * * *